US005455760A

United States Patent [19]

Bilas et al.

[11] Patent Number: 5,455,760

[45] Date of Patent: Oct. 3, 1995

[54] COMPUTER-CONTROLLED CIRCUIT BREAKER ARRANGEMENT WITH CIRCUIT BREAKER HAVING IDENTIFICATION CIRCUIT

[75] Inventors: Ron J. Bilas; Drew A. Reid, both of Cedar Rapids, Iowa

[73] Assignee: Square D Company, Palatine, Ill.

[21] Appl. No.: 901,453

[22] Filed: Jun. 19, 1992

Related U.S. Application Data

[63] Continuation-in-part of Ser. No. 723,370, Jun. 28, 1991, Pat. No. 5,231,565.

[51] Int. Cl.$^{6}$ .......... G06F 19/00

[52] U.S. Cl. .......... 364/140; 364/483; 364/492

[58] Field of Search .......... 364/140, 141, 364/146, 188, 189, 481, 483, 492–495, 184–187, 145; 361/57, 71, 97, 98, 101, 88–93, 634–636, 652–656; 340/825.06, 825.07; 307/34, 35, 38–41, 132 E, 115

[56] References Cited

U.S. PATENT DOCUMENTS

| | | | |
|---|---|---|---|
| 3,689,887 | 9/1972 | La Falce et al. | 340/825.07 |
| 3,842,249 | 10/1974 | Geyer et al. | 364/492 |
| 4,175,238 | 11/1979 | Breimesser et al. | 307/40 |
| 4,308,511 | 12/1981 | Borona | 335/14 |
| 4,338,647 | 7/1982 | Wilson et al. | 361/96 |
| 4,535,332 | 8/1985 | Miller et al. | 340/825.06 |
| 4,819,180 | 4/1989 | Hedman et al. | 364/492 |
| 4,827,369 | 5/1989 | Saletta et al. | 364/483 X |
| 4,918,566 | 4/1990 | Brodsky et al. | 361/166 |
| 4,937,757 | 6/1990 | Dougherty | 364/483 X |
| 4,958,252 | 9/1990 | Murphy | 364/483 X |
| 4,964,058 | 10/1990 | Brown, Jr. | 364/483 X |
| 5,164,876 | 11/1992 | Tripodi et al. | 364/483 X |

*Primary Examiner*—Joseph Ruggiero
*Attorney, Agent, or Firm*—Larry I. Golden; Kareem M. Irfan

[57] ABSTRACT

An energy management loadpanel arrangement includes a loadpanel enclosure having a plurality of circuit breakers, each of which opens and closes in response to a control signal so as to interrupt an associated current path. A microcomputer generates the control signals to control the position of the circuit breakers and their associated current paths. The circuit breakers include a digital code circuit which is manually set to indicate the type of circuit breaker, for example, a one, two or three pole circuit breaker.

21 Claims, 9 Drawing Sheets

PROCESSOR TO PROCESSOR COMMUNICATIONS LINK

COMPUTER-CONTROLLED CIRCUIT BREAKER ARRANGEMENT WITH CIRCUIT BREAKER HAVING IDENTIFICATION CIRCUIT

RELATED APPLICATION

This is a continuation-in-part of U.S. patent application Ser. No. 07/723,370, filed on Jun. 28, 1991, now U.S. Pat. No. 5,231,565, and entitled ELECTRICAL DISTRIBUTION SYSTEM HAVING MAPPABLE CONTROL INPUTS, incorporated herein by reference.

FIELD OF THE INVENTION

The present invention relates generally to circuit breaker tripping systems, and, more particularly, to microcomputer-based circuit breaker energy management systems in which the circuit breakers open and close in response to a control signal from a computer.

BACKGROUND OF THE INVENTION

Circuit breaker energy management systems are designed to control circuit breakers in a circuit breaker panelboard by commanding the circuit breakers to turn "on" and "off," so as to "close" and "open" the current path for efficient energy use. Typically, a microcomputer is programmed to generate such commands.

It is advantageous for such systems to be user-programmable and user-maintainable so that circuit breakers in the panelboard can be replaced and additional circuit breakers can be added to the system. In a newly installed system having all two-pole breakers, for example, the microcomputer would be programmed to control only two-pole circuit breakers at designated circuit breaker positions, or slots, in the panelboard. If the panelboard subsequently required, after initial installation, a three-pole circuit breaker, the program for the microcomputer would have to be replaced so that the microcomputer can communicate with, and properly control the newly added circuit breaker.

This type of adaptability is not only burdensome and expensive for the user, it is unacceptable in many applications in which accessibility is difficult or prohibited. Accordingly, a microcomputer-based circuit breaker energy management system is needed which overcomes these deficiencies of the prior art.

SUMMARY OF INVENTION

The present invention provides an energy management loadpanel arrangement including a loadpanel enclosure having a plurality of circuit breakers, at least one of which includes a digital circuit indicating the type of circuit breaker (for example, one, two or three pole) and which opens and closes in response to a control signal generated by a microcomputer.

In a particular embodiment, an energy management loadpanel arrangement includes a loadpanel enclosure and a plurality of circuit breakers secured in the enclosure. At least one of the circuit breakers is digitally-coded and capable of opening and closing in response to a control signal so as to interrupt an associated current path. A microcomputer responds to the digital signal by determining the type of circuit breaker represented by said digital signal and then generates the control signal to control the circuit breaker and its associated current path. Thus, the digital signal is used by the microcomputer to determine the identity, or type, of circuit breaker disposed at one or more of the circuit breaker positions in the loadpanel.

The circuit breaker that is digitally-coded includes an interface circuit that provides the data to the microcomputer serially, using only two lines. One of the lines is used to select (or activate) the interface circuit, and the other line is used to generate a clock pulse in one direction and to read the digital signal in the other direction. In an application requiring a multitude of circuit breakers each having a respective identification circuit, this two-line communication scheme is used in an array to provide access to the respective interface circuits of all the circuit breakers.

BRIEF DESCRIPTION OF THE DRAWINGS

Other advantages of the invention will become apparent upon reading the following detailed description and upon reference to the accompanying drawings, in which.

Figure 1A:
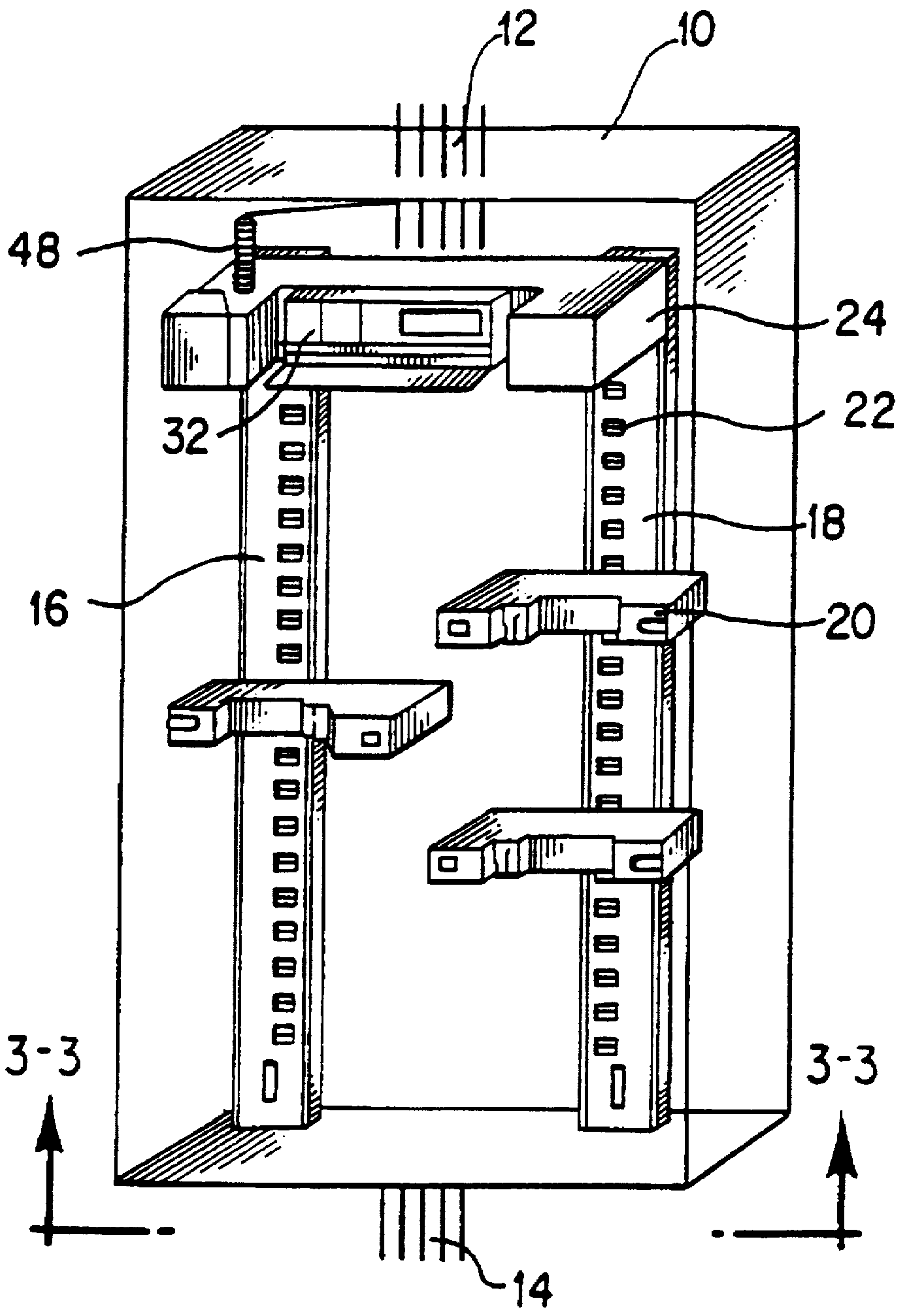
FIG. 1*a* is a perspective view of a load center arrangement, according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

THE BEST MODE FOR CARRYING OUT THE INVENTION

The present invention has direct application for managing energy by monitoring and interrupting current paths passing through a panelboard (or circuit breaker box), according to specifications that may be programmed by the user. For example, it may be desirous to program the panelboard so that certain types of circuit breakers open and close at specified times of the day. In this way, the energy provided through the panelboard can be efficiently used.

Figure 1B:
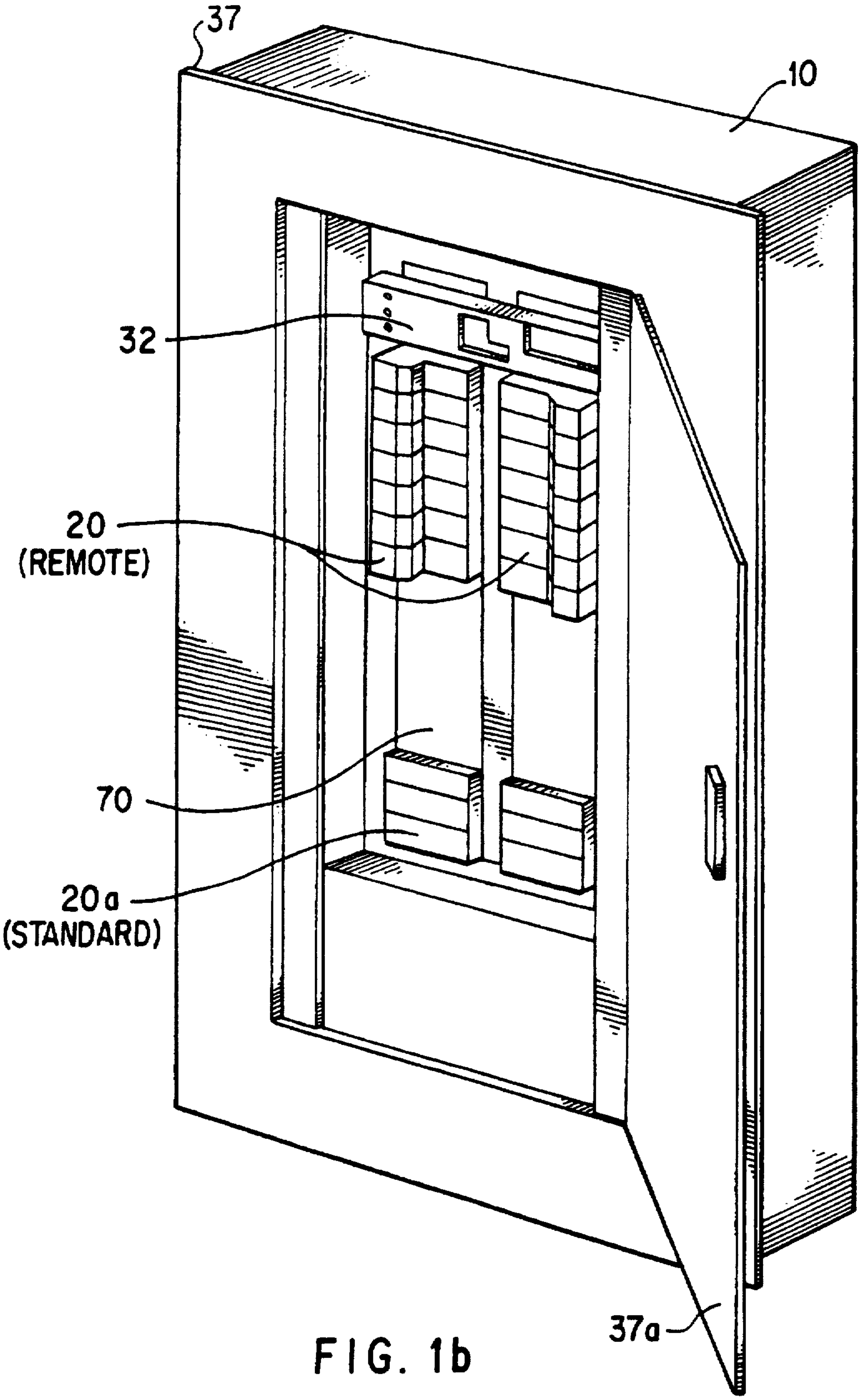
FIG. 1*b* is another perspective view of the load center arrangement of FIG. 1*a;*

The panelboard arrangement of FIGS. 1*a* and 1*b* provides an extremely adaptable and user-friendly panelboard, in which a panelboard or load-center enclosure 10 distributes, from a plurality of input power lines 12, power to various loads (not shown) via lines 14 which exit the enclosure 10. Bus boards 16 and 18, which may be implemented on the same board, are disposed in parallel on each side of the load-center for mounting remotely controlled circuit breakers 20, each having a plug-in socket which is coupled to one of a plurality of connectors 22 on the bus boards 16 and 18. The connectors 22 are used with the bus boards 16 and 18 to carry motor control and contact-status signals, via an interface module 24, to and from the circuit breakers 20. The interface module 24 interprets messages from a controller (or control module) 32 so as to facilitate electrical control and monitoring functions from both local and remote locations.

As illustrated in the block diagram of FIG. 2, the circuit breakers 20 are controlled by a microcomputer 102, which is part of the interface module (24 of FIG. 1) depicted below the dashed lines. Between the circuit breakers 20 and the microcomputer 102 there resides an interface circuit 104 which preferably includes an optical isolation circuit (not shown) to isolate the circuit breakers 20 from the remainder of the interface module.

Various types of circuits can be used to implement the interface circuit 104. For example, the I/O bits from the microcomputer 102 can be used so as to directly drive the inputs of the optical isolators. Alternatively, a modified version of the gate array circuit disclosed in "ELECTRICAL DISTRIBUTION SYSTEM WITH IMPROVED CIRCUIT FORMULTIPLE CIRCUIT BREAKER CONTROL", U.S. patent application Ser. No. 07/723,362, filed on Jun. 28, 1991, abandoned Jun. 20, 1993, can be used to implement the interface circuit 104. Such a gate array is described in connection with FIGS. 3 et seq.

The microcomputer 102 commands the circuit breakers to their respective "open" and "closed" positions according to respective 2-wire or 3-wire switch inputs provided at a dry contact interface 106. The connections for, and control over, the signals at the switch inputs can be implemented as set forth in the last-referenced application, or using conventional methods, such as the implementation in Square D Company's "PowerLink" product, or as described in U.S. patent application Ser. No. 07/620,237, filed on Nov. 29, 1990 and entitled "Power Management and Automation System, now U.S. Pat. No. 5,323,307." Alternatively, the circuit breakers 20 are controlled via a program stored by the microcomputer 120.

The microcomputer 102 uses conventional memory circuits, for example ROM 108 and EEPROM 110, for storage of its object code and other data requiring permanent or semi-permanent preservation.

As an option, the interface module can also include a serial interface circuit 112 to permit the microcomputer 102 to communicate with similarly situated panelboard arrangements, such as the one shown in FIGS. 1*a* and 1*b*.

The control module (32 of FIG. 1*b* and shown above dashed lines in FIG. 2) incorporates a microcomputer 120, and conventional memory circuits including ROM 122, EEPROM 124 and RAM 126, to provide the overall control for the panelboard arrangement. This control includes overall initialization, communication between the microcomputers 120 and 102, monitoring and control of the keyboard and display 130, and I/O communication via a serial interface 132 or a network interface 134. A multiplexer 136 is used to establish which interface 132 or 134 communicates with the microcomputer 120.

The keyboard and display 130 can be implemented using conventional LCD type driver and key read circuitry. For example, a 44 character by 8 line display and a 24 button push key circuit can be used to provide status-reading and function-programming capabilities to a user.

The ability to control the circuit breakers 20 according to the time of the day is established by a program entered via the keyboard and display 130. The microcomputer 120 employs a conventional real time clock (RTC) 138, such as the DS1283S available from Dallas Semiconductor, to maintain the time.

Figure 2:
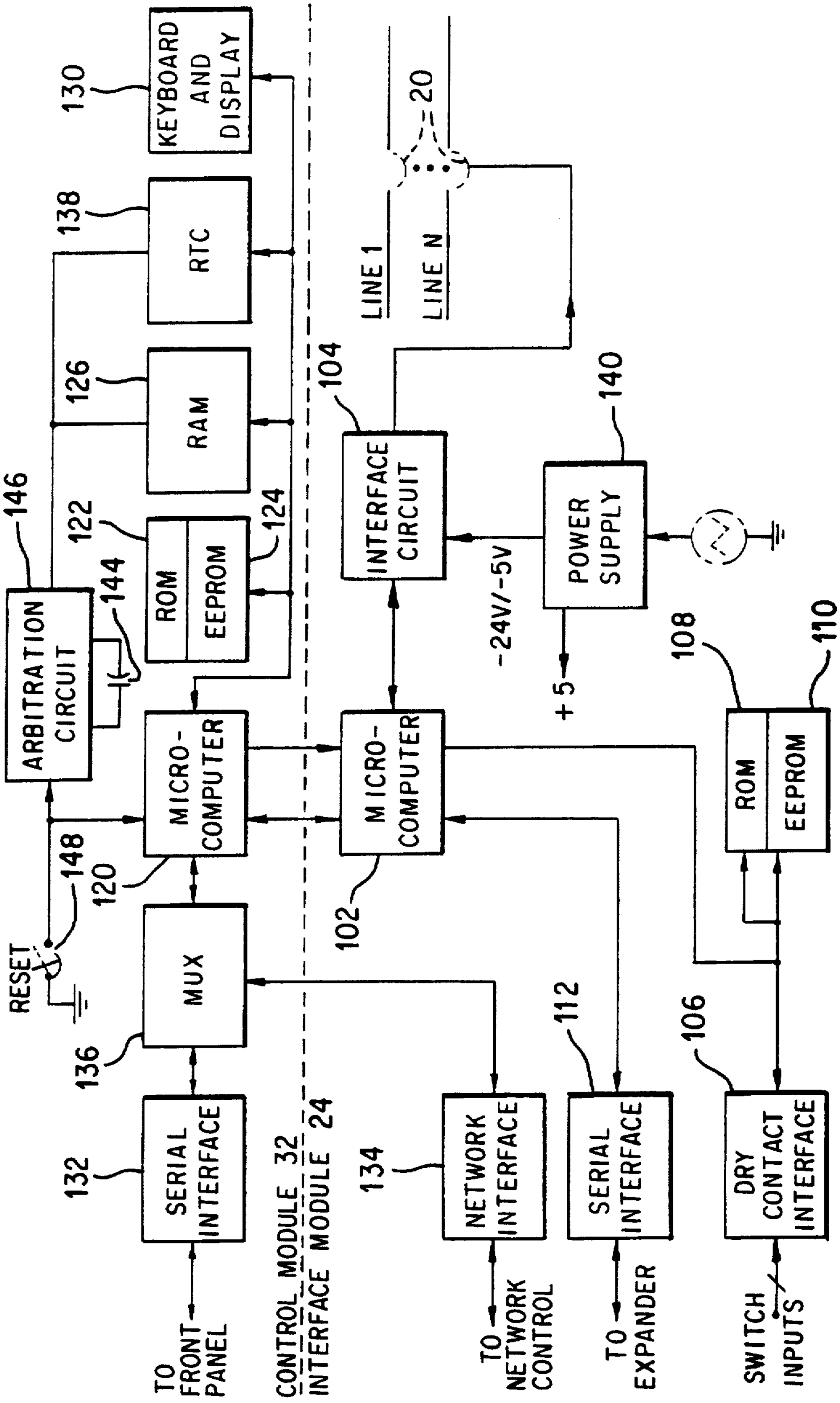
FIG. 2 is a block diagram of the control module and interface module shown in FIGS. 1*a* and 1*b;*

The entire panelboard arrangement of FIG. 2 is provided power via a conventional power supply 140, including a regulated Vcc (+5 Volts and associated common), a separately regulated +5 Volt Isolated ("VISO" and associated VISO common), and separately regulated −24 Volt and −5 Volt outputs sharing a common ground.

The power supply 140 is preferably sourced by a 240 volt AC or 480 volt AC line and, therefore, is susceptible to long-term interruptions. These long-term power interruptions, for example, are frequently encountered with electric company overloads, blackouts and other events requiring manual service or repair by the electric company. Thus, during these interruptions a secondary power supply is needed to maintain the integrity of important data which is used frequently and is not stored in the non-volatile EEPROM.

The secondary power supply is provided using an electrical double-layer capacitor (EDLC or SUPERCAP) 144, which supplies secondary power to the RTC 138 and RAM 126 via a power arbitration circuit 146. The arbitration circuit 146 ensures that a +5 Volt source supplies power to the RTC 138 and RAM 126 either from the power supply 140 or from a stored capacitive charge on the EDLC 144. Thus, in the event that the power supply 140 shuts down, each of the circuits shown in FIG. 2 powers down except for the RTC 138 and RAM 126 (and unshown logic support circuits), which stay powered up as long as there is sufficient charge on the EDLC 144. An FS or FE type SUPERCAP available from NEC Corporation, which may be used for this application, provides several weeks of standby power for the implementation shown in the figures.

A reset switch 148 is used to reset the entire circuit of FIG. 2 via its connection to both the microcomputer 120 and the arbitration circuit 146.

Other aspects of the EDLC 144 and the RTC 138 are discussed in copending U.S. patent application Ser. No. 901,058, now U.S. Pat. No. 5,315,499, entitled "COMPUTER CONTROLLED ENERGY MANAGEMENT ARRANGEMENT HAVING RELIABLE MEMORY AND CLOCK," filed concurrently herewith and assigned to the instant assignee. This application is also incorporated herein by reference.

Communication between the microcomputers 102 and 120 can be provided using any of a number of asynchronous or synchronous serial communication schemes. For example, synchronous communication can be provided using three lines which directly interconnect the microcomputers and establish the control microcomputer 120 as the master and the interface microcomputer 102 as the slave. Using Intel's 80C31B type microcomputers, for example, the P1.0 port for the master 120 and P1.4 port for the slave can be used as the data in/out line ("DATA"), the P1.1 port as an input for the master 120 and P1.5 port as an output for the slave can be used as the handshake line for the interface microcomputer 102 ("I.HS"), and the P1.2 port as an output for the master 120 and the INT1 port as an input for the slave can be used as the handshake line for the interface microcomputer 102 ("C.HS"). In such an implementation, the command/response format would be initiated by the master, by sending an OP-CODE type command followed by the number of data bytes to be sent, and followed by the data bytes and a checksum word. The response would be a response number, followed by the number of data bytes to be returned, and followed by the data bytes and a checksum word.

Error checking between the master and slave is also provided using a software watchdog timer in each microcomputer.

Figure 2A:
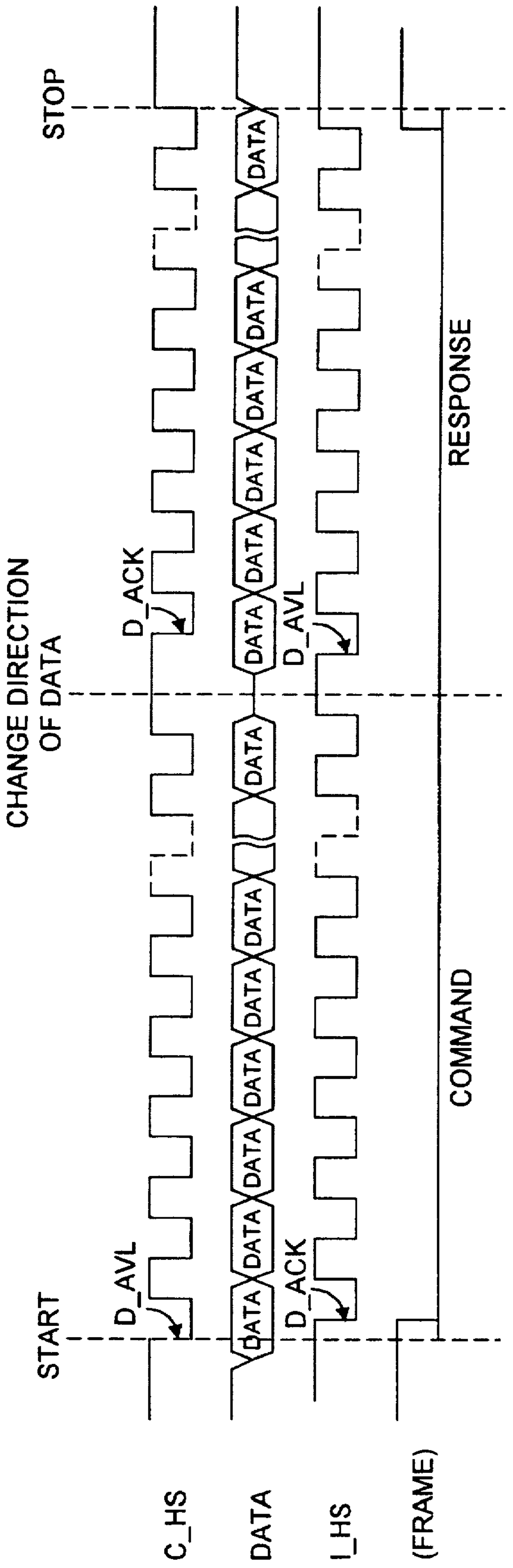
FIG. 2*a* is a timing diagram showing a useful communication channel for certain of the circuits shown in FIG. 2.

FIG. 2*a*, illustrates the timing of the communications between the microcomputers 102 and 120. In an exemplary communication scheme, the illustrated timing of FIG. 2*a* between the microcomputer 120, acting as the "Controller", and the microcomputer 102, acting as the "Interface", uses ten protocol steps as follows:

1. Controller initiates communications by putting up first bit of data and pulling C_HS low to indicate data is available.
2. Interface receives EXT_INT from C_HS, reads first bit, shifts it into receive byte, and then pulls I_HS low to acknowledge data received.
3. When seeing D_ACK, Controller removes D_AVL and waits for D_ACK to return high.
4. Simultaneously, the Interface waits for D_AVL to return high and will set D_ACK high when it happens.
5. When D_CK is high, Controller gets the next bit and repeats the cycle.
6. When Interface gets 8 bits, they are transferred to the communications buffer. On receipt of byte 2 (# of bytes), the byte counter is loaded.
7. When the number of bytes received equals the number of bytes in the counter +2 (for the checksum) Interface computes and compares th checksums.
8. The control module should be waiting for a response when all bytes are sent. The roles reverse, with Interface now sending data.
9. The process repeats until the cycle is complete.
10. The frame bit is set internally be each microprocessor to indicate the amount of time spent in the communications routine. This is used by the communications watchdog to stop the process and re-initialize if required.

Figure 3:
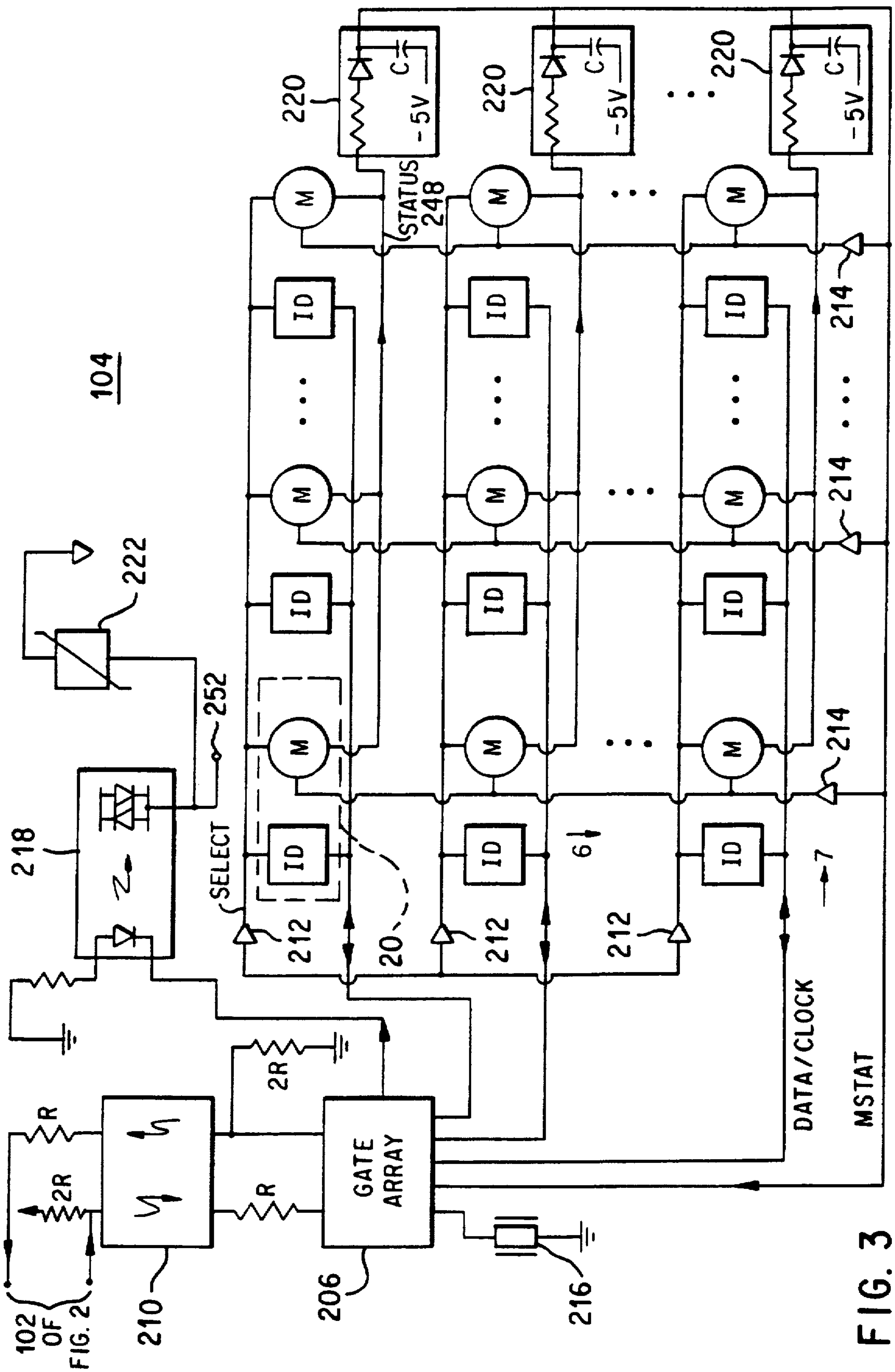
FIG. 3 is an expanded block diagram of a portion of the interface module of FIG. 2, illustrating a manner in which a microcomputer of the interface module can efficiently communicate with the circuit breakers through an interface circuit.

FIG. 3 illustrates the interface circuit 104 providing the control, and reading, of the circuit breakers 20 under control of the microcomputer 102 of FIG. 2. From the microcomputer, data is transmitted to and received from a gate array 206 serially, via an optical isolator 210. The gate array 210, which can be implemented using a semi-custom part available from ACTEL, Inc. of Sunnyvale, Calif., is provided a clock signal by a conventional oscillation circuit 216 operating, for example, at 455 kHz. The optical isolator 210 can be implemented using two NEC2501-1 type parts with respective resistors (R=1 k Ohm) providing the appropriate bias at the inputs and outputs of the optical isolator 210.

The serial communication between the microcomputer and the gate array 206 is performed using a sixteen bit word, the bits of which are as follows (beginning with least significant bit):

first nine bits: six address bits followed by three command bits;

tenth and eleventh bits: fixed bits at 0 and 1, respectively, for error detection;

next four bits: check bits using a hamming code;

last bit: fixed stop bit at 1.

There are five commands implemented in the three command bits. They are: 001—open, 101—close, 010—read motor status, 110—read contact status, 100—read ID circuit, and 000—NO OP. The NO OP command is used to read the transmit buffer in the gate array without communicating with the circuit breakers. The transmit buffer in the gate array is automatically read whenever one of the other commands is sent to the gate array.

The gate array 206 feeds six circuit breaker row drivers 212 and seven circuit breaker column drivers 214, which are configured seven down and six across, respectively, for controlling the motors "M" and identification circuits "ID" of up to forty-two circuit breakers. Each of the circuit breaker row drivers 212 and circuit breaker column drivers 214 acts as an amplifier to the corresponding signal from the gate array 206.

Each row driver 212 is used to select (or enable) the circuits of six circuit breakers, while each column driver 214 is used to actuate the circuit breaker motor and identification circuit pair which is selected by the intersecting row driver 212.

A status filter 220 is connected to the circuit breakers in each row in order to receive a status signal from a particular circuit breaker. The status signal is used to report whether the contacts of the circuit breaker are open or closed. The status signal from a circuit breaker is operative, and readable via the gate array 206, when two conditions are present: the corresponding column driver 214 is selecting the column of circuit breakers in which the status filter 220 is associated; and the gate array 206 is actuating a triac circuit (e.g., a Siemens IL420) 218 to provide, simultaneously, a momentary common path (LED COMM on the bus boards 16 and 18 of FIG. 1*a*) for the input ports of the optical isolators 230 (FIG. 6) of all forty-two of the circuit breakers. The gate array 206 then reads all six statuses and determines which of these statuses are to be sent to the controller 32. The circuit breaker contacts are preferably monitored using a lead 231 (FIG. 6) connected to the load terminal of the circuit breaker 20.

A varistor 222, such as a GE-V30DLA2, is coupled across the output ports of the triac circuit 218 to provide circuit protection against voltage and current transients.

Figure 4:
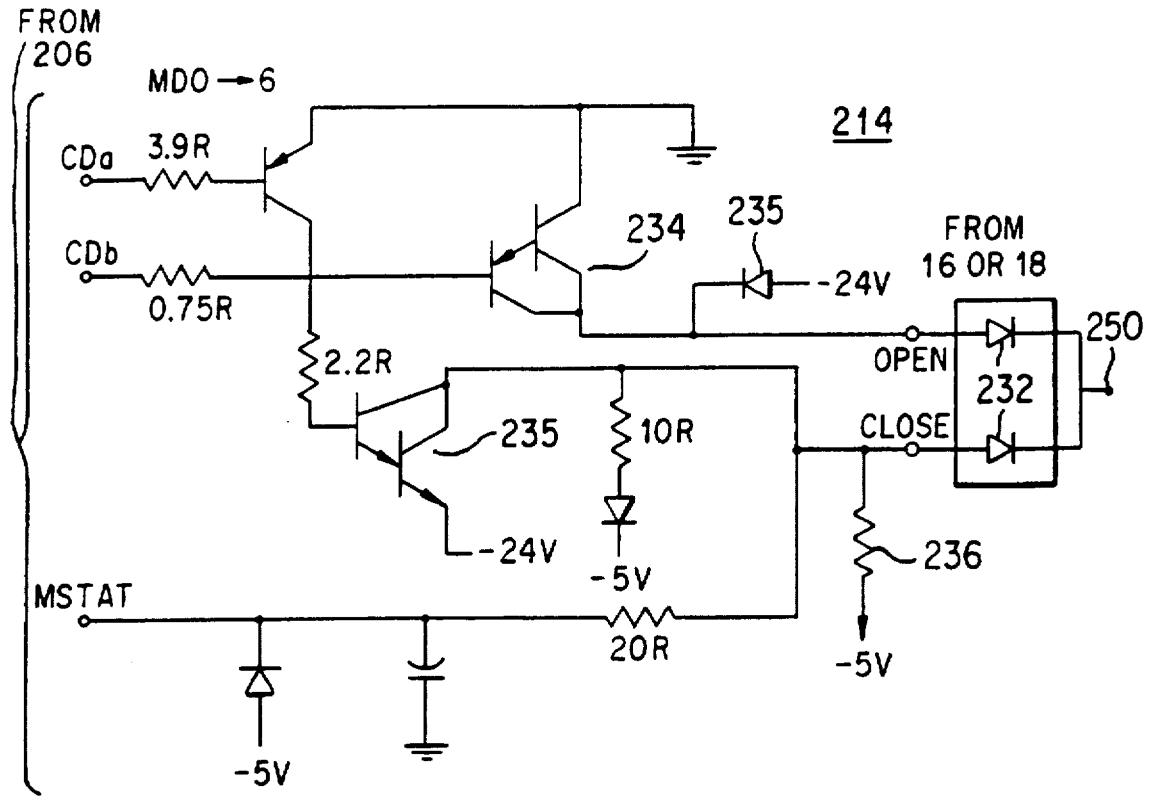
FIG. 4 is a schematic diagram of one of several motor driver circuits illustrated in FIG. 3.

In FIG. 4, the column (or motor) driver 214 is shown as being controlled by the gate array 206 using CDa, CDb and MSTAT leads so as to drive the motor on the selected circuit breaker 20. The diodes 232 through which the motor drive signal passes are located on the bus board 16 or 18 to allow a current path through only one circuit breaker 20. The CDa and CDb signals from the gate array 206 are controlled in a polarized manner between −5 Volts and common so that if either signal is absent, the designated circuit breaker 20 cannot be commanded to open or close its contacts.

The MSTAT signal is used to indicate whether or not a motor is present. This type of status check operates in substantially the same manner as the statuses from the associated circuit breaker load, as described above. The MSTAT signal is operative when the corresponding column driver 214 selects the column of circuit breakers associated with the circuit breaker under test. The gate array 206 then reads all six MSTAT signals and determines which of these signals are to be sent to the controller 32. A diode 235 is connected between −24 Volts and "OPEN" to prevent the signal level on "OPEN" from falling below this point, a pull-down resistor 236 is connected between −5 Volts and "CLOSE" to maintain the signal at −5 Volts when it is not being driven by the designated circuit breaker.

Figure 5:
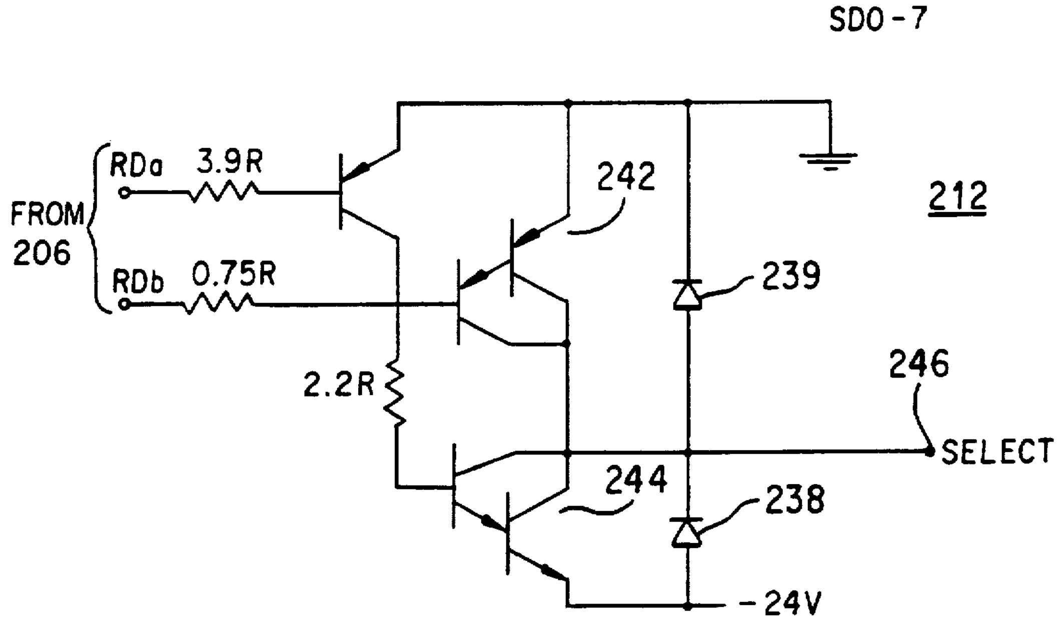
FIG. 5 is a schematic diagram of one of several circuit breaker select driver circuits illustrated in FIG. 3.

In FIG. 5, the row (or select) driver 212 is shown as being controlled by the gate array 206 using RDa and RDb leads so as to select the appropriate row of circuit breakers 20. The diodes 238 and 239 are used to mitigate the effect of transient signals received from the bus boards 16 and 18.

Figure 6:
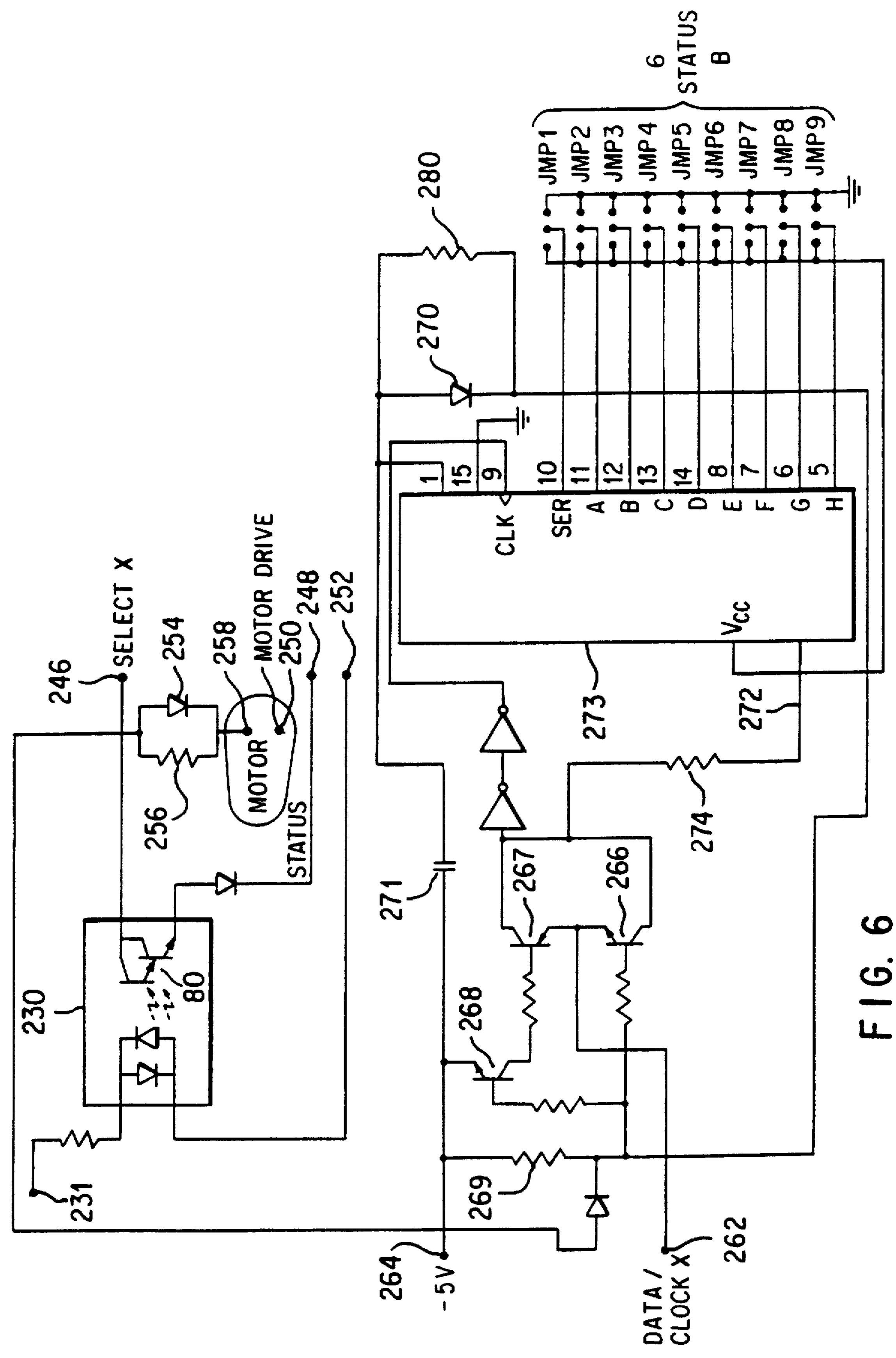
FIG. 6 is a schematic diagram of the electrical portion of a circuit breaker illustrated in FIG. 1*a;*

FIG. 6, which illustrates the electrical control portion of the preferred remote control circuit breaker 20, depicts six leads carried by each plug-in connector (22 of FIG. 1*a*) of the bus boards 16 and 18. The first four of these include: the select lead 246, status lead 248, motor drive lead 250 and an isolator enable lead 252. The signals of each of these leads are carried on the bus boards 16 and 18 (FIG. 1*a*) using the six-by-seven array configuration of FIG. 3 to limit the number of conductors required to communicate with the circuit breakers.

A parallel resistor/diode arrangement 254/256 serves two functions. The diode 254 may be used to provide current flow in a unilateral direction, while the resistor 256 is used to control the power provided from lead 258 to the motor of the circuit breaker 20. The value of the resistor 256 is selected according to the necessary current specified to operate the motor. In the event that the lead 258 is used to control a plurality of poles, e.g., for controlling two or three circuit breaker poles, the resistance required will vary. For single pole operation by a FK130S-10300 Mabuchi motor, the value of the resistor 256 is preferably 12 Ohms.

The remaining two leads carried by each plug-in connector, data/clock 262 and −5 Volts 264, are used in combination with select 246 to control and access the identification portion of the circuit in the circuit breaker. This configuration allows the transmission of encoded digital information from the gate array to as many as forty-two conductors using a limited number of conductors, using conventional parts and using no internal clock.

Each of nine status bits, which are manually settable at JMP1–JMP9 positions, are converted to serial data at lead 272 using a 74HC165 shift register 273 so as to permit up to 256 digital signals to be read by the gate array. These signals can be used to indicate how many poles the circuit breaker includes, the current rating of the circuit breaker, and other information that is associated with the circuit breaker or with the circuit breaker position. For example, the controller can determine if there exists a circuit breaker in a particular circuit breaker position by using all "0"s to indicate that no circuit breaker is present, and another code to identify the type and/or status of a device in that position that is not a circuit breaker, for example, a plug-in surge protector. Other possibilities exist as well.

The identification circuit remains inactive while power is off and presents a high impedance to any circuitry connected to the clock/data lead under these conditions. When select 246 is either open circuited or taken to the same voltage potential as −5 Volts 264, transistors 266–268 are inactive and data/clock 262 appears as a high impedance input to external circuitry. A 1000 Ohm resistor 269 bleeds off any charge from between Vcc and −5 Volts, and a diode 270 discharges capacitor 271 in preparation for when power is next applied to select 246.

Power is applied between select 246 and −5 Volts 264 by setting select 246 to 0 Volts. When this occurs, capacitor 271 will be discharged and will hold SH_LD input of the shift register 273 low for a short time causing the data present at SER and A–H inputs to be parallel loaded into the shift register 273. Also during this initialization phase, transistors 266–268 will be enabled and the voltage at data/clock 262 (set to "high" at initialization) will appear at the collectors of transistors 266 and 267. After stabilization of the initialization phase, the CLK input of the shift register 273 will be high and its SH_LD input will also be high allowing the shift register 273 to enter its shift mode of operation. At this point, the data present at the H input will be present at QH output of the shift register 273. A 100 kOhm resistor 280 acts to hold the power on the shift register down until select 246 reaches 0 Volts.

To transmit data from the shift register 273, a specific sequence of events is used. To read the first bit present at QH, all that is required is to tri-state data/clock 262. If the data present at QH is a "1", QH will hold the line high through a 1000 Ohm resistor 274. If the data present at QH is a "0", data/clock 262 will be pulled low through the resistor 274. In either case, the data present in the shift register 273 will not be shifted because its clock requires a low-to-high transition to shift the data.

To shift the next data bit to the QH output, the first step is to take data/clock 262 from tri-state to low. This action has no effect on the clock input of the shift register 273. If QH is low, it will remain low; if it is high, it will be pulled low because data/clock 262 will over-drive the QH output through the resistor 274. In either case, the shift register will not have been clocked yet.

The next step is to drive data/clock high. This will drive the clock input high and cause a data shift regardless of the state of QH. The data is then read by tri-stating the data/clock and reading the data present at QH via the resistor 274 and the transistors 266–267. If QH is high, data/clock 262 will simply remain high; if it is low, data/clock 262 will go low. In either case the data in the shift register will not be inadvertently shifted.

The SER input to the shift register 273 is set for odd or even parity to provide error detection.

Accordingly, each of the data bits at JMP1–JMP9 is shifted and read by tri-stating the data/clock, reading the data present at QH and then taking data/clock 262 from tri-state to low for the next data bit.

For further details concerning the configuration of the gate array of FIG. 3, a two-sheet schematic, representing the detailed electrical configuration of the gate array of FIG. 3, is attached hereto as a fuse-file list (used to program the gate array) in Appendix A. Also, a one-sheet pin-out list identifying the pinout/interface circuitry configuration for the gate array of FIG. 3 is attached hereto as appendix B. The pinout/pin-name list for the gate array is listed in appendix C.

Figure 7:
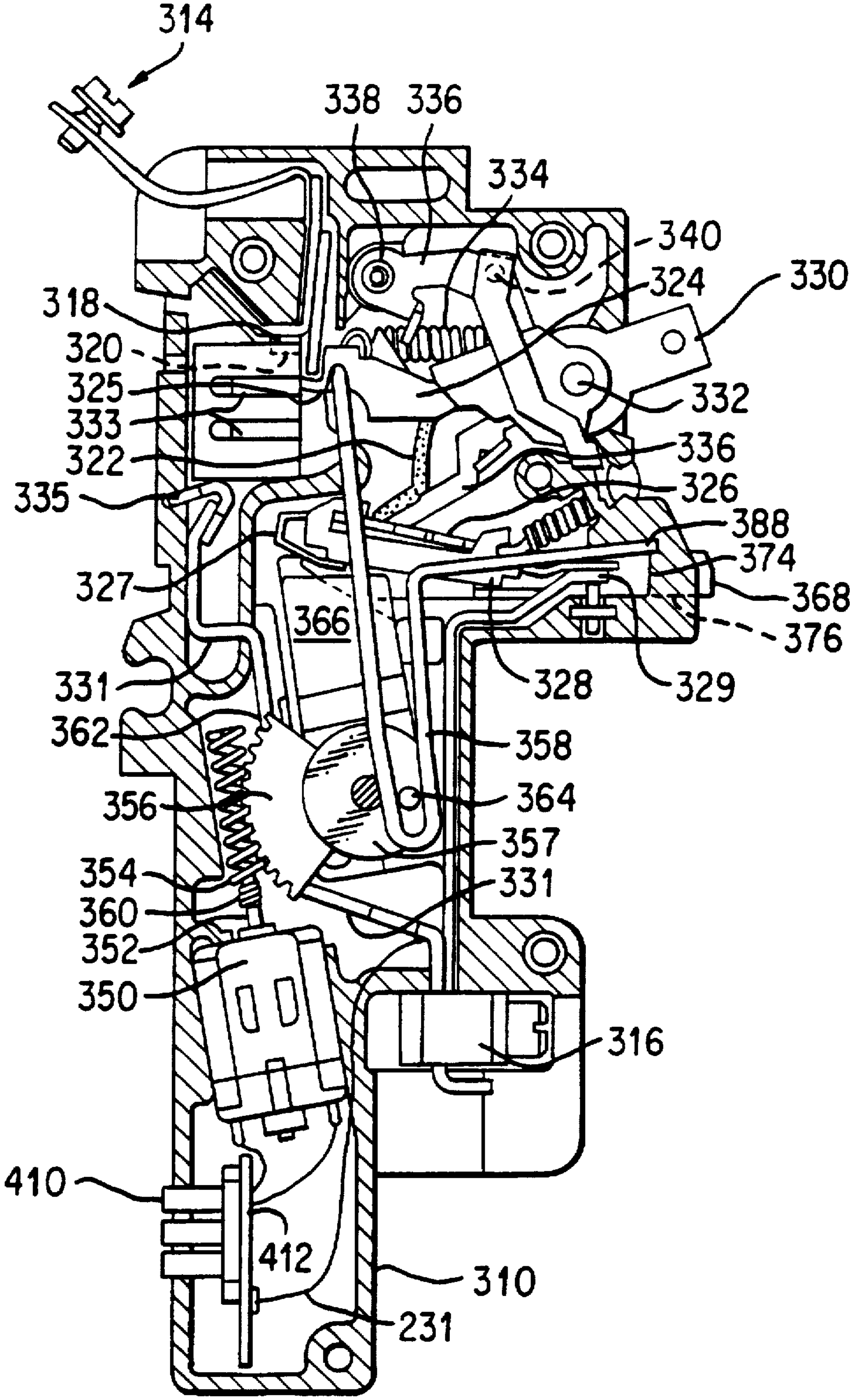
FIG. 7 illustrates a circuit breaker, according to the present invention, which may be used as part of the arrangement shown in FIGS. 1*a* and 1*b*.

An implementation for the circuit breaker 20 is shown in expanded form in FIG. 7. The arrangement includes an insulative body or housing 310, a line terminal 314 and a load terminal 316 for completing the circuit between the source and load (not shown). More specifically, the circuit path beginning at line terminal 314 carries current through stationary and movable contacts 318 and 320 and through a flexible copper conductor 322, which is soldered between a carrier 324 and a bimetal 328. A rigid conductive plate 329 carries current from the bimetal 328 to the load terminal 316.

Remote control is provided using a motor 350 having a shaft 352 which rotates in one direction to pull the carrier 324 and break the current path and which rotates in the opposite direction to allow the carrier 324 to be pulled by spring 334 to re-establish the current path. This is accomplished with a shaft spring 354 which is mounted around the shaft 352, and a gear 356 which rotates about a pin 357 to control a hook-shaped drive rod assembly 358 which includes an end which bends into a hole 325 in the contact carrier 324 for pulling the carrier 324. The shaft spring 354 is secured at one end 360 to the shaft 352, using a torsional-type pressure fitting, so that the shaft spring 354 rotates with the motor shaft 352. The gear 356 includes teeth 362 which interlock with the windings of the spring 354 to establish a linear relationship between the rotation of the shaft 352 and the rotation of the gear 356 about pin 357. For example, clockwise rotation of the shaft 352 may correspond to a counterclockwise rotation of the gear 356 about pin 357.

A coupling pin 364, which is secured to and protrudes out of the gear 356, responds to the rotation of the gear 356 to control the position of the contact carrier 324. As the gear teeth 362 move with the shaft spring 354, the side of the gear 356 opposite the teeth 362 rotates to the same degree, thereby forcing the coupling pin 364 to rotate about pin 357. The movement of the coupling pin 364 in the counterclockwise direction pulls the drive rod assembly 358 a, b to the right in order to pull the contact carrier 324 away from the stationary contact 318. The drive rod assembly 358 a, b is sufficiently long to provide a gap on the right side of the coupling pin 364 when the gear 356 is fully rotated clockwise so that the contact carrier 324 does not prevent the contacts 318 and 320 from closing.

In response to the motor operating in the opposite direction, the coupling pin 364 rotates in the clockwise direction and allows the biasing spring 334 to return the contact carrier 324 to the contacts-closed position.

The circuit of FIG. 6 can be implemented on the printed circuit board 412, or the upper and lower halves of the circuit of FIG. 6 can be mounted on separate printed circuit boards and "piggy-backed" together. A conventional six-pin connector 410 is used to mate the circuit breaker with the bus board 16 or 18 of FIG. 1*a*.

For additional information concerning the operation and structure of this circuit breaker, reference may be made to U.S. patent application Ser. No. 07/722,050, filed Jun. 28, 1991, now U.S. Pat. No. 5,180,051, entitled "REMOTE CONTROL CIRCUIT BREAKER, and assigned to the instant assignee.

Figure 8:
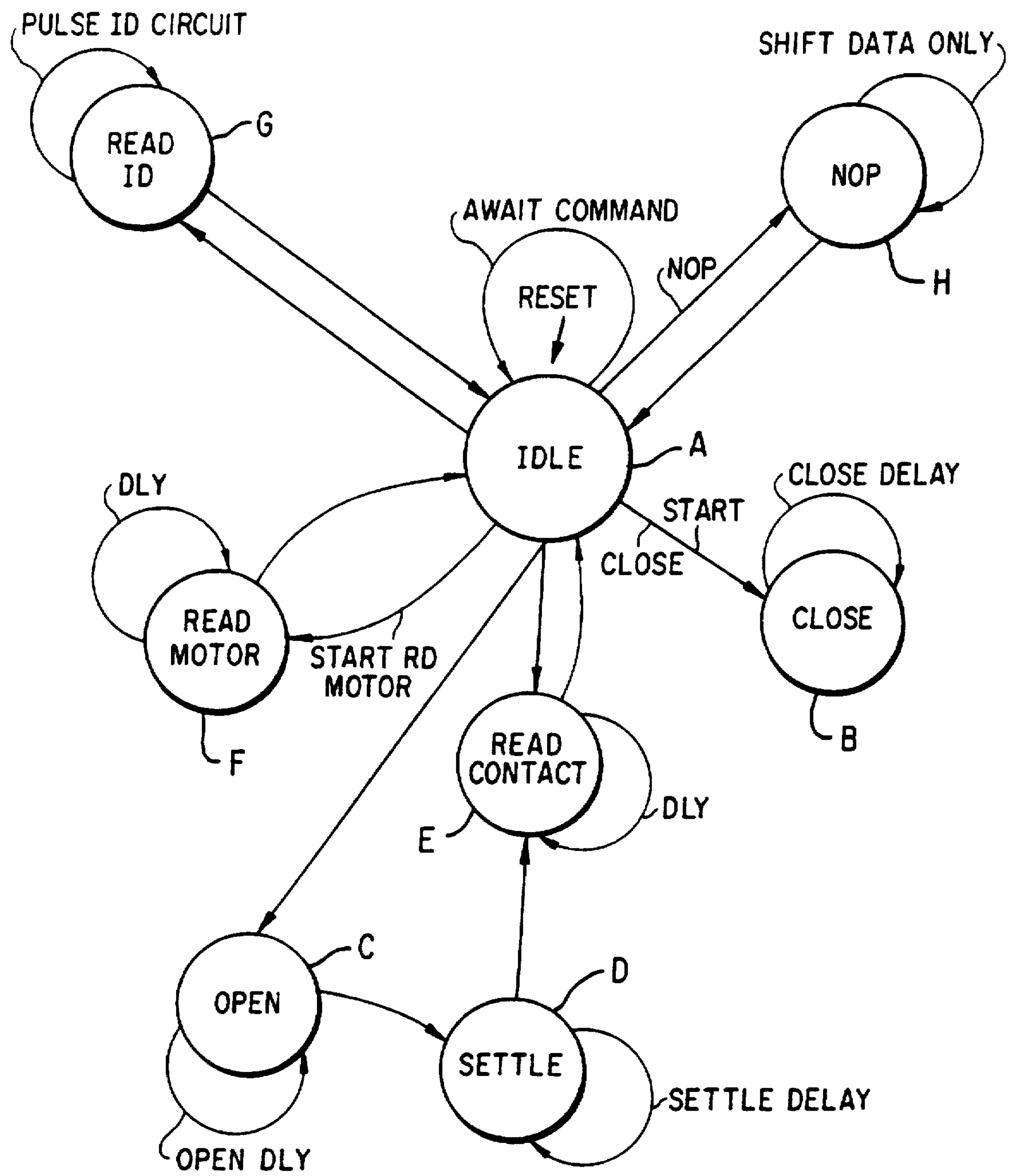
FIG. 8 is a state diagram depicting the power driver, data transmit and data receive operations of the gate array illustrated in FIG. 3.

FIG. 8 illustrates, in state diagram form, the power driver, data transmit and data receive operations of the gate array of FIG. 3. The diagram includes eight states, depicted A–H. Beginning at state A, the gate array waits for a command from the controller. The command may be any one of the commands previously discussed: a close contacts command which instructs a particular circuit breaker to close its contacts, depicted by the sequence of states A-B-D-E-A; an open contacts command which instructs a particular circuit breaker to open its contacts, depicted by the sequence of states A-C-D-E-A; a read contacts command to determine if a particular circuit breaker's contacts are closed or open, depicted by the sequence of states A-E-A; a read motor command to determine if the motor is present, depicted by the sequence of states A-F-A; a read ID circuit command to read the digital code in the circuit breaker, depicted by the sequence of states A-G-A; and a NO OP, depicted by the sequence of states A-H-A. The state delay associated with state D is to allow the contacts sufficient time to settle before reading the status of the contacts at state E. The state delays associated with states B and C are to allow the contacts sufficient time to react before commencing the settling-time delay of state D. The state delays associated with states E and F are to provide the gate array with the appropriate timing response before reporting to the controller with the requested status.

While the invention has been particularly shown and described with reference to a few particular embodiments, it will be recognized by those skilled in the art that modifications and changes may be made to the present invention described above without departing from the spirit and scope thereof. For example, in view of their similarities, many of the components or blocks disclosed herein may be substituted and/or combined with the arrangement disclosed in the application entitled, "ELECTRICAL DISTRIBUTION SYSTEM HAVING MAPPABLE CONTROL INPUTS," supra.

```
; HEADER
; FILEID FUSEFUS /designs/em2kact/em2kact.fus 14005bb9
; CHECKSUM 14005bb9
; PROGRAM Action Logic System
; VERSION 1.22
; DEPEND DDFDIE /actel/die1020.ddf 9fe38a0b
; DEPEND FUSEADL /designs/em2kact/em2kact.adl a0fd292e
; DEPEND FUSESEG /designs/em2kact/em2kact.seg 5fc03720
; DEPEND FUSELOC /designs/em2kact/em2kact.loc bdc35912
; DEPEND MODLIB /actel/modlib.lib b0797af4
; VAR DDFDIE /actel/die1020.ddf
; VAR FUSEADL /designs/em2kact/em2kact.adl
; VAR ADLIB /actel/adl04.lib
; VAR DDFPACKAGE /actel/pkg1020.ddf
; VAR ROUTEADL /designs/em2kact/em2kact.adl
; VAR ROUTELOC /designs/em2kact/em2kact.loc
; VAR PLACEPIN /designs/em2kact/em2kact.pin
; VAR PLACECRT /designs/em2kact/em2kact.crt
; VAR FUSESEG /designs/em2kact/em2kact.seg
; VAR PLACEADL /designs/em2kact/em2kact.adl
; VAR FUSELOC /designs/em2kact/em2kact.loc
; VAR FUSEEXTRA 1
; VAR FUSALLLATE 1
; VAR MODLIB /actel/modlib.lib
; ENDHEADER
```

| | | | | | | |
|---|---|---|---|---|---|---|
| X03110b0b0b1012 | X03190b0b08191a | X031b0b0b100b20 | X03270b09092627 | X0b060b0204002b | X0b0d0b0704002b | X0b170b0004002b |
| X0b110b010b1012 | X0b1a0b0308191a | X0b120b07100b20 | X0b270b07092627 | X0b060b0404002b | X0b0e0b0304002b | X0b170b0204002b |
| X0b120b030b1012 | X0b1a0b0508191a | X0b140b01100b20 | X03230b0801222b | X0b060b0504002b | X0b0e0b0504002b | X0b170b0304002b |
| X03110b09131112 | X03170b080e111a | X0b190b06100b20 | X0b230b0701222b | X0b070b0004002b | X0b0e0b0704002b | X0b180b0004002b |
| X0b110b06131112 | X0b140b070e111a | X0b1b0b05100b20 | X0b250b0701222b | X0b070b0504002b | X0b0f0b0104002b | X0b180b0204002b |
| X0b120b06131112 | X0b150b070e111a | X0b1b0b07100b20 | X0b280b0701222b | X0b070b0604002b | X0b0f0b0204002b | X0b190b0004002b |
| X030e0b0b050e0f | X0b170b070e111a | X0b1f0b01100b20 | X0b170b0603002b | X0b080b0404002b | X0b0f0b0304002b | X0b190b0204002b |
| X0b0f0b07050e0f | X0b190b070e111a | X03040b0a06000a | X0b180b0603002b | X0b080b0504002b | X0b0f0b0504002b | X0b190b0304002b |
| X03130b0b061113 | X030b0b0c12060f | X0b040b0106000a | X0b000b0004002b | X0b080b0604002b | X0b0f0b0604002b | X0b1b0b0304002b |
| X0b110b03061113 | X0b0f0b0412060f | X0b080b0306000a | X0b000b0104002b | X0b080b0704002b | X0b100b0004002b | X0b1b0b0404002b |
| X0b120b01061113 | X03160b0801101b | X0b090b0106000a | X0b000b0204002b | X0b090b0304002b | X0b100b0104002b | X0b1c0b0304002b |
| X030d0b09060d0e | X0b100b0701101b | X0b0a0b0606000a | X0b000b0304002b | X0b090b0404002b | X0b100b0204002b | X0b1c0b0404002b |
| X0b0e0b06060d0e | X0b110b0701101b | X03080b0a0b0009 | X0b010b0004002b | X0b090b0504002b | X0b100b0304002b | X0b1c0b0604002b |
| X03140b0b131314 | X0b160b0701101b | X0b050b030b0009 | X0b010b0104002b | X0b090b0704002b | X0b100b0504002b | X0b1c0b0704002b |
| X0b130b01131314 | X0b180b0701101b | X0b070b010b0009 | X0b010b0504002b | X0b0a0b0104002b | X0b100b0604002b | X0b1d0b0304002b |
| X03150b0b081516 | X031b0b0c071a1b | X0b090b060b0009 | X0b020b0004002b | X0b0a0b0204002b | X0b110b0004002b | X0b1d0b0404002b |
| X0b160b03081516 | X0b1a0b07071a1b | X03030b0c0e0003 | X0b020b0104002b | X0b0a0b0304002b | X0b110b0204002b | X0b1d0b0604002b |
| X03100b0b180c16 | X03050b0c100506 | X0b020b070e0003 | X0b020b0204002b | X0b0a0b0504002b | X0b110b0504002b | X0b1d0b0704002b |
| X0b130b00180c16 | X0b060b07100506 | X031a0b08111721 | X0b020b0404002b | X0b0a0b0704002b | X0b120b0204002b | X0b1e0b0304002b |
| X03100b09080a14 | X031c0b0c081b1c | X0b1a0b06111721 | X0b020b0504002b | X0b0b0b0104002b | X0b120b0504002b | X0b1e0b0404002b |
| X0b0d0b01080a14 | X0b1c0b01081b1c | X0b1b0b06111721 | X0b030b0104002b | X0b0b0b0204002b | X0b130b0204002b | X0b1e0b0604002b |
| X0b0e0b01080a14 | X03040b0b0e0405 | X0b200b06111721 | X0b030b0204002b | X0b0b0b0304002b | X0b130b0404002b | X0b1f0b0004002b |
| X030a0b0c180a0b | X0b050b010e0405 | X0b210b06111721 | X0b030b0504002b | X0b0b0b0504002b | X0b130b0504002b | X0b1f0b0204002b |
| X0b0a0b04180a0b | X030f0b0b000e1d | X03200b0b182021 | X0b030b0704002b | X0b0b0b0604002b | X0b130b0604002b | X0b1f0b0304002b |
| X0b0b0b04180a0b | X0b1a0b01000e1d | X0b200b01182021 | X0b040b0404002b | X0b0b0b0704002b | X0b130b0704002b | X0b1f0b0404002b |
| X03180b0b0d1618 | X0b1b0b01000e1d | X0b210b05182021 | X0b040b0504002b | X0b0c0b0004002b | X0b140b0004002b | X0b1f0b0704002b |
| X0b160b010d1618 | X03130b09020c1f | X03230b0b002123 | X0b040b0604002b | X0b0c0b0104002b | X0b140b0204002b | X0b200b0404002b |
| X0b170b010d1618 | X0b120b00020c1f | X0b210b07002123 | X0b040h0704002b | X0b0c0b0204002b | X0b140b0304002b | X0b200b0704002b |
| X0b180b030d1618 | X0b140b06020c1f | X03220b0b182223 | X0b050b0004002b | X0b0c0b0304002b | X0b150b0004002b | X0b210b0004002b |
| X03080b0b0e0810 | X0b190b01020c1f | X0b230b01182223 | X0b050b0204002b | X0b0c0b0504002b | X0b150b0104002b | X0b210b0204002b |
| X0b0c0b070e0810 | X0b1a0b00020c1f | X03230b09102324 | X0b050b0404002b | X0b0c0b0604002b | X0b150b0204002b | X0b220b0004002b |
| X03080b0c180809 | X0b1b0b00020c1f | X0b230b00102324 | X0b050b0504002b | X0b0d0b0004002b | X0b150b0304002b | X0b220b0104002b |
| X0b080b00180809 | X0b1e0b07020c1f | X0b240b00102324 | X0b050b0604002b | X0b0d0b0204002b | X0b150b0604002b | X0b220b0204002b |
| X0b090b00180809 | X0b1f0b06020c1f | X03250b0b112526 | X0b050b0704002b | X0b0d0b0304002b | X0b160b0004002b | X0b220b0304002b |
| X03070b0b100708 | X031f0b09071e1f | X0b250b01112526 | X0b060b0004002b | X0b0d0b0404002b | X0b160b0204002b | X0b220b0404002b |
| X0b080b01100708 | X0b1e0b00071e1f | X0b260b05112526 | X0b060b0104002b | X0b0d0b0604002b | X0b160b0604002b | X0b220b0504002b |

| | | | | | | |
|---|---|---|---|---|---|---|
| X0b220b0404002b | X0b1e0b050c002b | X0b170a03081718 | X0b050a0009000b | X0b010a0404002b | X0b170a0204002b | X03210a0c05122b |
| X0b220b0704002b | X0b1f0b050c002b | X0b180a03081718 | X0b050a0109000b | X0b020a0404002b | X0b170a0504002b | X0b130a0605122b |
| X0b230b0504002b | X0b200b020c002b | X030e0a090e0810 | X0b090a0109000b | X0b020a0604002b | X0b170a0604002b | X0b140a0105122b |
| X0b230b0604002b | X0b200b030c002b | X0b080a000e0810 | X03030a090b0009 | X0b020a0704002b | X0b170a0704002b | X0b160a0105122b |
| X0b240b0104002b | X0b210b030c002b | X0b0a0a020e0810 | X0b020a050b0009 | X0b030a0404002b | X0b180a0204002b | X0b180a0105122b |
| X0b240b0304002b | X0b210b040c002b | X0b0a0a040e0810 | X0b030a010b0009 | X0b030a0504002b | X0b180a0604002b | X0b1b0a0105122b |
| X0b240b0504002b | X0b230b020c002b | X03090a0c180809 | X0a040a000b0009 | X0b030a0704002b | X0b180a0704002b | X0b1d0a0105122b |
| X0b250b0004002b | X0b230b040c002b | X0b080a04180809 | X0b060a020b0009 | X0b040a0204002b | X0b190a0204002b | X03150a0a06142b |
| X0b250b0204002b | X0b240b020c002b | X0b090a00180809 | X0b090a030b0009 | X0b040a0704002b | X0b190a0504002b | X0b160a0506142b |
| X0b260b0004002b | X0b240b040c002b | X03070a09100708 | X030f0a0b0d0013 | X0b050a0204002b | X0b190a0604002b | X0b1a0a0706142b |
| X0b260b0204002b | X0b250b030c002b | X0b070a01100708 | X0b060a070d0013 | X0b050a0504002b | X0b190a0704002b | X0b1d0a0606142b |
| X0b270b0104002b | X0b250b040c002b | X0b080a03100708 | X0b0b0a010d0013 | X0b050a0704002b | X0b1a0a0004002b | X0b200a0606142b |
| X0b270b0404002b | X0b260b030c002b | X03190a090e111a | X0b0c0a010d0013 | X0b060a0104002b | X0b1a0a0204002b | X0b210a0106142b |
| X0b270b0504002b | X0b260b040c002b | X0b140a030e111a | X0b0f0a060d0013 | X0b060a0304002b | X0b1a0a0404002b | X03210a0908212b |
| X0b280b0004002b | X0b270b020c002b | X0b190a030e111a | X0b120a010d0013 | X0b060a0404002b | X0b1a0a0504002b | X0b270a0108212b |
| X0b280b0104002b | X0b270b060c002b | X03090a0b12060f | X0b130a010d0013 | X0b060a0604002b | X0b1a0a0604002b | X032b0a040a002b |
| X0b280b0204002b | X0b280b040c002b | X0b0d0a0412060f | X03020a0c0e0003 | X0b070a0004002b | X0b1b0a0004002b | X0b010a070a002b |
| X0b280b0504002b | X0b280b060c002b | X0b0d0a0512060f | X0b020a030e0003 | X0b070a0404002b | X0b1b0a0204002b | X0b230a070a002b |
| X0b290b0004002b | X0b290b040c002b | X0b0e0a0112060f | X030b0a0b110011 | X0b070a0504002b | X0b1b0a0404002b | X0b260a070a002b |
| X0b290b0104002b | X0b290b060c002b | X031a0a0a01101b | X0b080a02110011 | X0b070a0704002b | X0b1b0a0604002b | X03180a0a0b162b |
| X0b290b0204002b | X0b2a0b060c002b | X0b100a0001101b | X03000a05120002 | X0b080a0504002b | X0b1b0a0704002b | X0b180a050b162b |
| X0b290b0504002b | X0b2b0b090c002b | X0b140a0001101b | X0b010a05120002 | X0b080a0704002b | X0b1c0a0204002b | X0b1a0a010b162b |
| X0b2a0b0004002b | X0b2b0b0a0c002b | V021c0a00 | X030c0a0a13000d | X0b090a0404002b | X0b1c0a0504002b | X0a1d0a000b162b |
| X0b2a0b0104002b | X0b2b0b0b0c002b | X031a0a09181a1c | X0a030a0013000d | X0b090a0504002b | X0b1c0a0704002b | X0a200a000b162b |
| X0b2a0b0504002b | X0b2b0b0c0c002b | X0a1c0a00181a1c | X0b050a0613000d | X0b090a0704002b | X0b1d0a0204002b | X0b010a060c002b |
| X03240b0a08212b | X031f0b0c0e1e2b | V02040a00 | X0b0a0a0713000d | X0b0a0a0104002b | X0b1d0a0704002b | X0b020a020c002b |
| X0b230b0308212b | X0b200b050e1e2b | V021d0a00 | X031f0a0b011f21 | X0b0a0a0304002b | X0b1e0a0204002b | X0b030a020c002b |
| X0b240b0608212b | X0b210b010e1e2b | X03060a0c080406 | X0b1f0a00011f21 | X0b0a0a0504002b | X0b1e0a0504002b | X0b040a040c002b |
| X0b250b0608212b | X0b250b050e1e2b | X0b040a03080406 | X0b210a00011f21 | X0b0b0a0204002b | X0b1e0a0604002b | X0b050a040c002b |
| X0b260b0608212b | X0b260b010e1e2b | X031d0a0a000e1d | X03170a0a111721 | X0b0b0a0304002b | X0b1e0a0704002b | X0b060a050c002b |
| X0b010b060c002b | X03240b0b0f1a2b | X0b110a00000e1d | X0b1b0a05111721 | X0b0b0a0704002b | X0b1f0a0204002b | X0b070a060c002b |
| X0b020b060c002b | X0b1a0b040f1a2b | X0b150a00000e1d | X0b1c0a06111721 | X0b0c0a0304002b | X0b1f0a0504002b | X0b090a020c002b |
| X0b030b040c002b | X0b1b0b020f1a2b | X031d0a0b071c1d | X0b200a07111721 | X0b0c0a0404002b | X0b1f0a0704002b | X0b0c0a020c002b |
| X0b030b060c002b | X03250b0818242b | X0b1d0a05071c1d | X0b210a07111721 | X0b0c0a0604002b | X0b200a0204002b | X0b0d0a020c002b |
| X0b040b020c002b | X0b240b0718242b | V02030a00 | X03200a0c182021 | X0b0c0a0704002b | X0b200a0504002b | X0b0d0a030c002b |
| X0b040b030c002b | X0b260b0718242b | V021c0a00 | X0b200a01182021 | X0b0e0a0204002b | X0b210a0204002b | X0b0d0a060c002b |
| X0b060b060c002b | X0b290b0718242b | X03040a0c120305 | V02230a00 | X0b0c0a0504002b | X0b210a0504002b | X0b0e0a000c002b |
| X0b070b030c002b | X03100a09051011 | X0b030a06120305 | V02240a00 | X0b0f0a0504002b | X0b210a0604002b | X0b0e0a030c002b |
| X0b080b020c002b | X0b100a01051011 | X031e0a09081d1e | X03220a0c112224 | X0b0f0a0704002b | X0b220a0204002b | X0b0e0a040c002b |
| X0b090b020c002b | V020f0a00 | X0b1e0a01081d1e | X0b220a07112224 | X0b100a0204002b | X0b220a0304002b | X0b0f0a020c002b |
| X0b0c0b040c002b | V02130a00 | X031b0a0a020c1f | X0b230a01112224 | X0b100a0504002b | X0b230a0204002b | X0b0f0a030c002b |
| X0b0d0b050c002b | X030e0a0c050e0f | X0b160a00020c1f | X0b240a07112224 | X0b100a0604002b | X0b230a0304002b | X0b0f0a040c002b |
| X0b0e0b000c002b | X0a0f0a00050e0f | X0b170a00020c1f | X03250a09112526 | X0b100a0704002b | X0b230a0604002b | X0b100a030c002b |
| X0b0e0b020c002b | X03120a09111213 | X031c0a0913151f | X0b250a00112526 | X0b110a0104002b | X0b240a0204002b | X0b100a040c002b |
| X0b0e0b040c002b | X0b120a05111213 | X0b160a0313151f | X0b260a00112526 | X0b110a0204002b | X0b240a0304002b | X0b110a040c002b |
| X0b100b040c002b | X0b130a05111213 | X0b1e0a0313151f | V02270a00 | X0b110a0304002b | X0b240a0604002b | X0b130a040c002b |
| X0b110b040c002b | X03130a09131314 | V02200a00 | X03280a09152628 | X0b110a0504002b | X0b250a0204002b | X0b140a040c002b |
| X0b120b040c002b | X0b140a05131314 | X031e0a0a100b20 | X0a270a00152628 | X0b110a0604002b | X0b250a0304002b | X0b150a040c002b |
| X0b130b030c002b | X03150a090b1315 | X0b180a00100b20 | X03220a0801222b | X0b110a0704002b | X0b250a0604002b | X0b160a040c002b |
| X0b140b040c002b | X0b130a020b1315 | X0b190a00100b20 | X0b220a0501222b | X0b120a0004002b | X0b260a0204002b | X0b170a040c002b |
| X0b140b050c002b | X0b150a030b1315 | X03080a0a01000f | X0b230a0501222b | X0b120a0204002b | X0b260a0304002b | X0b180a040c002b |
| X0b150b040c002b | V020b0a00 | X0b030a0301000f | X0b240a0501222b | X0b120a0304002b | X0b260a0604002b | X0b190a040c002b |
| X0b150b050c002b | X030b0a09060b0c | X0b050a0301000f | X0b250a6501222b | X0b120a0404002b | X0b270a0204002b | X0b1a0a030c002b |
| X0b160b040c002b | X0b0b0a05060b0c | X0b070a0301000f | X0b260a0501222b | X0b120a0604002b | X0b270a0504002b | X0b1c0a040c002b |
| X0b160b050c002b | X0b0c0a05060b0c | X0b080a0101000f | X03260a0902262b | X0b120a0704002b | X0b270a0604002b | X0b1d0a030c002b |
| X0b170b040c002b | X03160a0b180c16 | X030b0a0c05000b | X0b280a0002262b | X0b130a0304002b | X0b270a0704002b | X0b1d0a040c002b |
| X0b170b050c002b | X0b0c0a00180c16 | X0b020a0105000b | X0b290a0002262b | X0b130a0704002b | X0b280a0204002b | X0b1e0a030c002b |
| X0b180b040c002b | X0b0d0a00180c16 | X0b040a0105000b | X0b080a0603002b | X0b140a0204002b | X0b280a0504002b | X0b1e0a040c002b |
| X0b180b050c002b | X0b0d0a07180c16 | X0b0b0a0405000b | X0b090a0603002b | X0b140a0604002b | X0b280a0604002b | X0b1f0a030c002b |
| X0b190b040c002b | X0b0e0a07180c16 | X030a0a0a06000a | X0b0a0a0603002b | X0b140a0704002b | X0b280a0704002b | X0b1f0a040c002b |
| X0b190b050c002b | V020a0a00 | X0b020a0006000a | X0b0b0a0603002b | X0b150a0204002b | X0b290a0104002b | X0b1f0a060c002b |
| X0b1a0b020c002b | X030a0a0b080a14 | X0b060a0006000a | X0b0e0a0603002b | X0b150a0504002b | X0b290a0204002b | X0b200a030c002b |
| X0b1c0b020c002b | X0b0d0a01080a14 | X03000a04080003 | X0b000a0004002b | X0b150a0604002b | X0b290a0604002b | X0b200a040c002b |
| X0b1c0b050c002b | X030c0a0b0b0a0c | X0b010a03080003 | X0b000a0104002b | X0b150a0704002b | X0b2a0a0004002b | X0b210a030c002b |
| X0b1d0b020c002b | X0a0a0a000b0a0c | X03050a0909000b | X0b000a0204002b | X0b160a0204002b | X0b2a0a0104002b | X0b210a040c002b |
| X0b1d0b050c002b | X0a0b0a000b0a0c | X0b040a0509000b | X0b000a0304002b | X0b160a0604002b | X0b2a0a0404002b | X0b220a040c002b |
| X0b1e0b020c002b | X03170a09081718 | X0b040a0609000b | X0b010a0004002b | X0b160a0704002b | X0b2b0a0a04002b | X0b220a060c002b |

| | | | | | | |
|---|---|---|---|---|---|---|
| X0b230a040c002b | X03180909071819 | X0b170906100b20 | X0b03090004002b | X0b15090704002b | X0b2b090a04002b | X0b100801060f10 |
| X0b240a040c002b | X0b180901071819 | X0b180906100b20 | X0b03090504002b | X0b16090004002b | X0314090b06142b | X0311080b131112 |
| X0b250a040c002b | X0b190903071819 | X0b190906100b20 | X0b04090004002b | X0b16090504002b | X0b1f090606142b | X0b110803131112 |
| X0b260a040c002b | V021a0901 | X0b1b0906100b20 | X0b04090204002b | X0b17090004002b | X0b26090406142b | X0b110805131112 |
| X0b270a030c002b | X0307090b100708 | X0b1c0906100b20 | X0b04090504002b | X0b17090204002b | X0b27090606142b | X0b120801131112 |
| X0b270a040c002b | X0b070900100708 | V02210901 | X0b05090504002b | X0b17090404002b | X0a28090106142b | X030f080a050e0f |
| X0b280a030c002b | X031a090c0e111a | X03020909080003 | X0b05090704002b | X0b17090504002b | X0320090907202b | X0b0e0802050e0f |
| X0b280a040c002b | X0b1209010e111a | X0b020901080003 | X0b06090104002b | X0b17090704002b | X0b24090407202b | X0b0f0800050e0f |
| X0b290a040c002b | X0306090a0e0607 | X0b030901080003 | X0b06090304002b | X0b18090404002b | X0b28090607202b | X030e0809130e10 |
| X0b2a0a060c002b | X0b0609020e0607 | X0308090a0b0009 | X0b06090404002b | X0b18090504002b | X0322090b08212b | X0b100800130e10 |
| X0b2b0a0b0c002b | X0b0709010e0607 | X0b0209030b0009 | X0b06090504002b | X0b18090704002b | X0b22090608212b | V020d0800 |
| X0b2b0a0c0c002b | X0308090912060f | X0b0309030b0009 | X0b06090704002b | X0b19090004002b | X0b24090608212b | X030c080b050c0d |
| X03270a0a0f1a2b | X0b06090612060f | X0b0409030b0009 | X0b07090404002b | X0b19090504002b | X0b25090608212b | X0b0c0803050c0d |
| X0b1b0a030f1a2b | X0b08090312060f | X0b0509030b0009 | X0b07090504002b | X0b1a090204002b | X0324090b0a002b | X0b0c0805050c0d |
| X03180a0814182b | X0b0d090012060f | X0b0809010b0009 | X0b08090004002b | X0b1a090304002b | X0a0f09010a002b | X0b0d0801050c0d |
| X0b220a0014182b | V021c0901 | X030009060e0003 | X0b08090204002b | X0b1a090604002b | X0b0409040c002b | X030c0809090c0e |
| X0b250a0714182b | X0305090b000507 | X0b0109030e0003 | X0b08090404002b | X0b1b090204002b | X0b0509020c002b | X0b0d0804090c0e |
| X0b260a0114182b | X0b070907000507 | X03000905100004 | X0b08090504002b | X0b1b090504002b | X0b0509040c002b | X0b0e0801090c0e |
| X03290a0c15292b | X03060909100506 | X0b010904100004 | X0b09090104002b | X0b1c090204002b | X0b0709020c002b | X0313080b0b1315 |
| X0b2b0a0915292b | X0b050900100506 | X03000907120002 | X0b09090304002b | X0b1c090504002b | X0b0709030c002b | X0b1308030b1315 |
| X0310090a051011 | X0b060900100506 | X0b010905120002 | X0b09090404002b | X0b1d090204002b | X0b0b09020c002b | X0b1508040b1315 |
| X0b100900051011 | X031b0909081b1c | X0320090b111721 | X0b09090504002b | X0b1d090504002b | X0b0b09030c002b | X0315080b081516 |
| X0b110900051011 | X0b1b0901081b1c | X0b1a0904111721 | X0b09090604002b | X0b1e090204002b | X0b0c09020c002b | X0b150802081516 |
| V020f0901 | X0b1c0903081b1c | X0b1b0904111721 | X0b09090704002b | X0b1e090504002b | X0b0d09020c002b | X0b150803081516 |
| X030f0909060f10 | X03050909080406 | X0b1c0904111721 | X0b0a090004002b | X0b1f090304002b | X0b0d09050c002b | X030a0809080a14 |
| X0b0f0903060f10 | X0b040907080406 | X0b1d0904111721 | X0b0a090204002b | X0b1f090704002b | X0b0e09020c002b | X03140808080a14 |
| X0b0f0905060f10 | X030409090e0405 | X0b1e0904111721 | X0b0a090404002b | X0b20090304002b | X0b0f09020c002b | X0317080b071617 |
| X0b100901060f10 | X0b0409010e0405 | V02220901 | X0b0a090504002b | X0b20090404002b | X0b1009020c002b | X0b170803071617 |
| X0312090c131112 | X0b0509010e0405 | X0320090a022022 | X0b0a090604002b | X0b20090604002b | X0b1009030c002b | X0b170804071617 |
| X0b110901131112 | X0316090b000e1d | X0b200902022022 | X0b0a090704002b | X0b20090704002b | X0b1109020c002b | X0309080a10090a |
| V02130901 | X0b140903000e1d | X0b220902022022 | X0b0b090404002b | X0b21090004002b | X0b1109030c002b | X0b0a080010090a |
| X030e090a050e0f | X0a150901000e1d | V02240901 | X0b0b090504002b | X0b21090204002b | X0b1209020c002b | X030a080b00080a |
| X0b0e0900050e0f | X0b160903000e1d | X0323090a102324 | X0b0b090704002b | X0b21090304002b | X0b1209030c002b | X0b08080700080a |
| X0b0f0900050e0f | X0a170901000e1d | X0b230902102324 | X0b0c090304002b | X0b21090604002b | X0b1309020c002b | X030c080c0e0810 |
| X0312090a111213 | X0b180903000e1d | X0b240902102324 | X0b0c090404002b | X0b22090304002b | X0b1809020c002b | X0b0908070e0810 |
| X0b120900111213 | X0a190901000e1d | V02250901 | X0b0c090704002b | X0b22090504002b | X0b1a09050c002b | X0308080c180809 |
| X0b130900111213 | X0b1b0903000e1d | X0321090a151c25 | X0b0d090104002b | X0b22090704002b | X0b1d09030c002b | X0b090801180809 |
| X03130909131314 | X0a1c0901000e1d | X0a220901151c25 | X0b0d090304002b | X0b23090104002b | X0b1e09030c002b | X0318080b071819 |
| X0b130905131314 | X031d0908071c1d | X0b230906151c25 | X0b0d090404002b | X0b23090304002b | X0b1f09050c002b | X0b180800071819 |
| V020c0901 | X0b1d0907071c1d | X0a250901151c25 | X0b0d090604002b | X0b23090404002b | X0b2009050c002b | X0b180803071819 |
| V02150901 | X031d0909081d1e | X0325090a112526 | X0b0d090704002b | X0b23090504002b | X0b2109040c002b | V02070800 |
| X031409090d1415 | X0b1d0901081d1e | X0b250902112526 | X0b0e090104002b | X0b23090704002b | X0b2109050c002b | V021a0800 |
| X0b1409010d1415 | X0b1e0901081d1e | X0b260902112526 | X0b0e090304002b | X0b24090304002b | X0b2709050c002b | X031308090e111a |
| X0b1509030d1415 | V021f0901 | V02270901 | X0b0e090404002b | X0b24090504002b | X0b2809020c002b | X0b1408010e111a |
| X030b090a060b0c | X031a090b020c1f | X0327090a092627 | X0b0e090504002b | X0b24090704002b | X0b2809050c002b | X0b1508000e111a |
| X0b0b0900060b0c | X031a0908020c1f | X0b270902092627 | X0b0e090604002b | X0b25090304002b | X0b2909020c002b | X0b1708000e111a |
| X0b0c0900060b0c | X0b120906020c1f | V02280901 | X0b0e090704002b | X0b25090404002b | X0b2909060c002b | X0b1808060e111a |
| V02170901 | X0b130906020c1f | X0327090901222b | X0b0f090404002b | X0b25090504002b | X0b2a09060c002b | V02060800 |
| X030d090a080a14 | X0b1d0906020c1f | X0b22090401222b | X0b0f090704002b | X0b25090704002b | X0b2b090b0c002b | V021b0800 |
| X0b110906080a14 | X0b1e0906020c1f | X0b02090603002b | X0b10090404002b | X0b26090104002b | X0b2b090c0c002b | X0306080b0a0607 |
| X030c09090b0a0c | X031e0909071e1f | X0b03090603002b | X0b10090504002b | X0b26090304002b | X0321090c0e1c2b | X0b0608030a0607 |
| X0b0a09030b0a0c | X0b1f0902071e1f | X0b04090603002b | X0b10090704002b | X0b26090504002b | X0b1f09000e1c2b | X0b0608050a0607 |
| X0b0c09050b0a0c | X031d090b13151f | X0b05090603002b | X0b11090404002b | X0b26090704002b | X0b2209000e1c2b | X0b0708010e0607 |
| X030b090c180a0b | X0b1a090713151f | X0b07090603002b | X0b11090504002b | X0b27090304002b | X0b2409000e1c2b | X030c080a12060f |
| X0b0b0901180a0b | X0b1b090713151f | X0b08090603002b | X0b11090704002b | X0b27090404002b | X0b2609000e1c2b | X0b0b080212060f |
| X03160909071617 | X0b1c090713151f | X0b0b090603002b | X0b12090404002b | X0b27090704002b | X0329090a15292b | X0b0c080012060f |
| X0b160901071617 | X0b1e090713151f | X0b0c090603002b | X0b12090504002b | X0b28090304002b | X0b29090015292b | X0b0e080712060f |
| X0b170903071617 | X031d090c181d1f | X0b0f090603002b | X0b12090704002b | X0b28090404002b | X0320090817002b | V02050800 |
| X0309090b02090b | X0a1f0901181d1f | X0b10090603002b | X0b13090304002b | X0b28090704002b | X0a01090117002b | V021c0800 |
| X0b09090002090b | V02010901 | X0b00090004002b | X0b13090404002b | X0b29090104002b | X0b01090717002b | X0305080a100506 |
| X0309090910090a | V02200901 | X0b00090104002b | X0b13090704002b | X0b29090404002b | X0b18090017002b | X0b050802100506 |
| X0b0a090110090a | X031f0909081f20 | X0b00090204002b | X0b14090004002b | X0b29090504002b | X0b21090717002b | X0b060802100506 |
| V02190901 | X0b1f0904081f20 | X0b00090304002b | X0b14090504002b | X0b29090704002b | X0a24090117002b | X031c0808181a1c |
| X030b09080e0810 | X031e090b100b20 | X0b01090204002b | X0b15090004002b | X0b2a090004002b | X0b26090617002b | X0b1a0806181a1c |
| X0b0809070e0810 | X0b140906100b20 | X0b01090604002b | X0b15090204002b | X0b2a090104002b | X030f080b060f10 | X0b1b0806181a1c |
| X0309090c180809 | X0b150906100b20 | X0b02090004002b | X0b15090404002b | X0b2a090504002b | X0b0f0803060f10 | V021d0800 |
| X0b090902180809 | X0b160906100b20 | X0b02090504002b | X0b15090504002b | X0b2b090904002b | X0b0f0805060f10 | X0304080b0e0405 |

X0b0408030c0405
X0b0408050c0405
X0b0508010c0405
V021c0800
X03030809120305
X0b040806120305
X031c080c011c1e
X0b1c0806011c1e
X0b1d0806011c1e
X0b1e0806011c1e
V02010800
V02200800
X031f080a081f20
X0b1f0800081f20
X0b200802081f20
X0313080a100b20
X0b0b0807100b20
X0b0e0804100b20
X0b120802100b20
X0b130800100b20
X030a080806000a
X0b05080606000a
X0b06080606000a
X0b0a080206000a
X0312080b070015
X0b0a0801070015
X0b0b0801070015
X0b0b0804070015
X030108090b0009
X030808080b0009
X030d08090d0013
X0b0408010d0013
X0b0608010d0013
X0b0b08000d0013
X0b0c08010d0013
X0b0e08000d0013
X0b0f08010d0013
X0b1108010d0013
X0b1208000d0013
X0304080a110011
X03100808110011
X0b0d0806110011
X03000804120002
X0b010804120002
X0311080a140017
X0b0a0806140017
X0b100804140017
X0b110800140017
X03210808111721
X0a1a0800111721
X0a1c0800111721
X0b1f0807111721
V02230800
X031f080b091b23
X0a1b0800091b23
X0a1d0800091b23
X0a1e0800091b23
X0322080a182223
X0b220800182223
X0b230802182223
V02250800
X0324080a092425
X0b240800092425
X0b250802092425
X0326080c002426
X0b240807002426
V02270800
X0326080a092627
X0b260800092627
X0b270802092627
X0327080c102527
X0b260807102527
V02280800
X0327080b152628
X0a280800152628
X0329080a02262b
X0b26080102262b
X0b27080102262b
X0b29080302262b
X0b0b080603002b
X0b0c080603002b
X0b0e080603002b
X0b0f080603002b
X0b10080603002b
X0b11080603002b
X0b12080603002b
X0b13080603002b
X0b28080603002b
X0b29080603002b
X0b00080004002b
X0b00080104002b
X0b00080204002b
X0b00080304002b
X0b01080104002b
X0b01080204002b
X0b01080604002b
X0b02080004002b
X0b02080104002b
X0b02080404002b
X0b03080004002b
X0b03080104002b
X0b03080404002b
X0b04080004002b
X0b04080204002b
X0b04080404002b
X0b04080704002b
X0b05080404002b
X0b05080504002b
X0b05080704002b
X0b06080404002b
X0b06080704002b
X0b07080204002b
X0b07080504002b
X0b07080604002b
X0b07080704002b
X0b08080004002b
X0b08080204002b
X0b08080504002b
X0b08080604002b
X0b09080004002b
X0b09080204002b
X0b09080304002b
X0b09080404002b
X0b09080604002b
X0b0a080404002b
X0b0a080504002b
X0b0a080704002b
X0b0b080504002b
X0b0c080404002b
X0b0c080704002b
X0b0d080504002b
X0b0d080704002b
X0b0e080504002b
X0b0f080404002b
X0b0f080704002b
X0b10080504002b
X0b10080704002b
X0b11080404002b
X0b11080704002b
X0b12080504002b
X0b12080704002b
X0b13080404002b
X0b13080504002b
X0b13080704002b
X0b14080004002b
X0b14080304002b
X0b14080404002b
X0b14080504002b
X0b14080704002b
X0b15080504002b
X0b15080704002b
X0b16080004002b
X0b16080104002b
X0b16080304002b
X0b16080404002b
X0b16080504002b
X0b17080204002b
X0b17080504002b
X0b17080704002b
X0b18080404002b
X0b18080504002b
X0b18080704002b
X0b19080004002b
X0b19080104002b
X0b19080304002b
X0b19080404002b
X0b19080504002b
X0b1a080104002b
X0b1a080204002b
X0b1a080304002b
X0b1a080404002b
X0b1a080504002b
X0b1a080704002b
X0b1b080104002b
X0b1b080204002b
X0b1b080404002b
X0b1c080204002b
X0b1c080404002b
X0b1c080504002b
X0b1c080704002b
X0b1d080104002b
X0b1d080204002b
X0b1d080304002b
X0b1d080404002b
X0b1d080504002b
X0b1d080704002b
X0b1e080104002b
X0b1e080204002b
X0b1e080304002b
X0b1e080404002b
X0b1e080504002b
X0b1e080704002b
X0b1f080104002b
X0b1f080304002b
X0b1f080404002b
X0b20080104002b
X0b20080304002b
X0b20080404002b
X0b20080504002b
X0b20080704002b
X0b21080004002b
X0b21080104002b
X0b21080204002b
X0b21080304002b
X0b21080404002b
X0b21080604002b
X0b22080104002b
X0b22080304002b
X0b22080404002b
X0b23080104002b
X0b23080404002b
X0b24080404002b
X0b24080504002b
X0b25080404002b
X0b25080504002b
X0b25080704002b
X0b26080304002b
X0b26080404002b
X0b27080404002b
X0b27080504002b
X0b27080704002b
X0b28080104002b
X0b28080304002b
X0b28080504002b
X0b28080704002b
X0b29080404002b
X0b29080504002b
X0b29080704002b
X0b2a080004002b
X0b2a080104002b
X0b2a080404002b
X0b2b080904002b
X0b2b080a04002b
X0b2b080c04002b
X0328080b09282b
X0b29080109282b
X0320080c0a002b
X0a0108000a002b
X0b1908070a002b
X0b1c08010a002b
X0b2108070a002b
X0b2208070a002b
X0b0208060c002b
X0b0308060c002b
X0b0508030c002b
X0b0708030c002b
X0b0708040c002b
X0b0808030c002b
X0b0808040c002b
X0b0908050c002b
X0b0a08030c002b
X0b0b08030c002b
X0b0c08020c002b
X0b0d08020c002b
X0b0d08030c002b
X0b0e08030c002b
X0b0f08020c002b
X0b1008030c002b
X0b1108020c002b
X0b1208030c002b
X0b1308010c002b
X0b1308020c002b
X0b1408060c002b
X0b1508010c002b
X0b1508060c002b
X0b1608060c002b
X0b1608070c002b
X0b1708010c002b
X0b1708060c002b
X0b1808010c002b
X0b1808020c002b
X0b1908060c002b
X0b1c08030c002b
X0b1f08050c002b
X0b2108050c002b
X0b2208050c002b
X0b2608050c002b
X0b2908020c002b
X0b2a08060c002b
X0b2b080b0c002b
X031e080b0d1c2b
X0b1f08060d1c2b
X0b2008060d1c2b
X0b2208060d1c2b
X0b2308060d1c2b
X0b2408060d1c2b
X0b2508060d1c2b
X0b2608060d1c2b
X0b2708060d1c2b
X0328080e0e1c2b
X0b1f08020e1c2b
X0a2008000e1c2b
X0b2208020e1c2b
X0a2308000e1c2b
X0b2408020e1c2b
X0a2508000e1c2b
X0b2608020e1c2b
X0a2708000e1c2b
X0328080a10282b
X0b28080210282b
X0b28080410282b
X0b29080010282b
X0310080912102b
X0b10080212102b
X0b12080412102b
X0b24080112102b
X0324080818242b
X0b24080318242b
X0b25080318242b
X0b27080318242b
V02110701
V020f0701
X030e070c050e0f
X0b0e0700050e0f
X0311070c061113
X0b110702061113
X0b110704061113
X0b130703061113
X0312070c111213
X0b120702111213
X0b120704111213
V02140701
X030f070a0b0d0f
X0b0d07070b0d0f
X0b0f07050b0d0f
X0314070c131314
X0b140702131314
V020c0701
X0315070b0d1415
X0b1507020d1415
V020b0701
X03150709081516
X0b150704081516
X03110709180c16
X0b140703180c16
V020a0701
X0310070b080a14
X0b0a0706080a14
X0b0c0705080a14
X0b0f0703080a14
X0b100701080a14
X030a070c180a0b
X0b0a0702180a0b
X0316070c071617
X0b160700071617
X0309070c10090a
X0b09070210090a
X03180709081718
X0b180704081718
V02080701
X030b070b0e0810
X0b0807070e0810
X0308070b180809
X0b090706180809
X0319070c071819
X0b190700071819
X0307070a100708
X0a080701100708
X0318070b09181a
X0b1a070209181a
X0312070b0e111a
X0b1107030e111a
X0b1207000e111a
X0b1207010e111a
X0b1807030e111a
V02060701
X030d070b12060f
X0b06070512060f
X0b07070012060f
X0b0b070012060f
X0b0c070312060f
X0b0d070112060f
X0310070c01101b
X0b10070201101b
X0b14070501101b
X0b18070201101b
X031b0709071a1b
X0b1a0704071a1b
V021c0701
X031b070c081b1c
X0b1b0700081b1c
V02040701
X030f070c000e1d
X0b0f0700000e1d
X0b170703000e1d
X031c070b071c1d
X0b1c0704071c1d
X031d0708081d1e
X0b1d0701081d1e
X0313070b020c1f
X0b1f0702020c1f
X0317070913151f
X0b150707131 51f
X0b180707131 51f
X0b1a070713151f
X0b1c070713151f
X0b1f070713151f
X0320070c081f20
X0b200700081f20
X03140708100b20
X0b130706100b20
X0b150706100b20
X0b170706100b20
X0b180706100b20
X0305070b070015
X0b040703070015
X0b050701070015
X0b070707070015
X0b0d0700070015
X0b110700070015
X0b110705070015
X0b150703070015
X0307070b0b0009
X0b0407050b0009
X0b0607030b0009
X0b0707010b0009
X0301070a180007
X03070708180007
X0321070b011f21
X0b1f0704011f21
X0317070b111721
X0b1c0702111721
X0321070a182021
X0b210707182021
X03220708022022
X0b200701022022
X0b210704022022
X0b220704022022
X0322070b102122
X0b220707102122
V02240701
V02250701
X0325070c092425
X0b250706092425
V02270701
X03270709092627
X0b270706092627
X0324070801222b
X0b24070501222b
X0b25070501222b
X0b27070501222b
X0b29070401222b
X0329070b02262b
X0b26070002262b
X0b04070603002b
X0b05070603002b
X0b06070603002b
X0b07070603002b
X0b0c070603002b
X0b0d070603002b
X0b0f070603002b
X0b10070603002b
X0b11070603002b
X0b12070603002b
X0b00070004002b
X0b00070104002b
X0b00070204002b
X0b00070304002b
X0b01070004002b
X0b01070104002b
X0b01070504002b
X0b02070004002b
X0b02070104002b
X0b02070504002b
X0b03070004002b
X0b03070104002b
X0b03070504002b
X0b04070004002b
X0b05070004002b

| | | | | | | |
|---|---|---|---|---|---|---|
| X0b05070504002b | X0b1e070504002b | X0b0507030c002b | X0b28070118242b | X0b1b0607071a1b | X0b250607151c25 | X0b0c060104002b |
| X0b06070004002b | X0b1e070704002b | X0b0707020c002b | X0b29070018242b | X031a060c0d191b | X0326060b112526 | X0b0c060204002b |
| X0b07070404002b | X0b1f070104002b | X0b0707030c002b | X0b2a070018242b | X0b1a06040d191b | X0b260600112526 | X0b0c060304002b |
| X0b07070504002b | X0b1f070304002b | X0b0807020c002b | V02110600 | X0b1b06000d191b | X0327060c092627 | X0b0c060504002b |
| X0b08070304002b | X0b1f070504002b | X0b0807050c002b | X03110609051011 | X03060609100506 | X0b270601092627 | X0b0c060704002b |
| X0b08070404002b | X0b1f070604002b | X0b0907000c002b | X0b100605051011 | X0b050601100506 | X0327060a102527 | X0b0d060204002b |
| X0b08070604002b | X0b20070404002b | X0b0a07000c002b | X0b110601051011 | X0b060603100506 | X0b250606102527 | X0b0d060304002b |
| X0b09070104002b | X0b20070504002b | X0b0a07050c002b | V02120600 | X031d060c000e1d | X0b260606102527 | X0b0d060604002b |
| X0b09070304002b | X0b20070704002b | X0b0b07020c002b | X030e060c130e10 | X03180608000e1d | X0b270607102527 | X0b0d060704002b |
| X0b09070404002b | X0b21070104002b | X0b0b07050c002b | X0b100602130e10 | X0b1c0602000e1d | X0328060b152628 | X0b0e060104002b |
| X0b09070504002b | X0b21070204002b | X0b0c07020c002b | V020d0600 | X031c060c071c1d | X0b270603152628 | X0b0e060404002b |
| X0b09070704002b | X0b21070304002b | X0b0d07020c002b | V02140600 | X0b1c0604071c1d | X0b270605152628 | X0b0f060104002b |
| X0b0a070304002b | X0b21070504002b | X0b0d07030c002b | X030d060a060d0e | X0b1d0600071c1d | X0b15060603002b | X0b0f060304002b |
| X0b0a070404002b | X0b21070604002b | X0b0e07020c002b | X0b0d0605060d0e | X031c0608011c1e | X0b16060603002b | X0b0f060404002b |
| X0b0a070704002b | X0b22070104002b | X0b0f07020c002b | X0313060c091214 | X0b1d0607011c1e | X0b18060603002b | X0b0f060504002b |
| X0b0b070304002b | X0b22070204002b | X0b1007000c002b | X0b130600091214 | X0b1e0600011c1e | X0b19060603002b | X0b0f060704002b |
| X0b0b070404002b | X0b22070304002b | X0b1007030c002b | X0b140602091214 | X031f060b071e1f | X0b1a060603002b | X0b10060404002b |
| X0b0b070604002b | X0b22070504002b | X0b1207030c002b | X03130609131314 | X0b1f0607071e1f | X0b1b060603002b | X0b10060704002b |
| X0b0b070704002b | X0b22070604002b | X0b1307000c002b | X0b130602131314 | X0317060913151f | X0b1c060603002b | X0b11060404002b |
| X0b0c070404002b | X0b23070104002b | X0b1307010c002b | X0a140600131314 | X0b15060013151f | X0b1d060603002b | X0b11060504002b |
| X0b0c070704002b | X0b23070404002b | X0b1307020c002b | V020c0600 | X0b18060013151f | X0b1f060603002b | X0b11060704002b |
| X0b0d070404002b | X0b23070504002b | X0b1407060c002b | X030d060c050c0d | X0b1a060013151f | X0b20060603002b | X0b12060404002b |
| X0b0d070504002b | X0b23070704002b | X0b1507010c002b | X0b0e0606050c0d | X0b1c060013151f | X0b23060603002b | X0b12060504002b |
| X0b0e070104002b | X0b24070304002b | X0b1607020c002b | X030b060c060b0c | X0b1f060013151f | X0b24060603002b | X0b12060704002b |
| X0b0e070304002b | X0b24070404002b | X0b1607050c002b | X0a0c0600060b0c | X031d0608181d1f | X0b29060603002b | X0b13060104002b |
| X0b0e070404002b | X0b24070604002b | X0b1707010c002b | X0315060c081516 | X0b1d0601181d1f | X0b2a060603002b | X0b13060304002b |
| X0b0e070504002b | X0b24070704002b | X0b1807010c002b | X0b150604081516 | X0b1e0607181d1f | X0b00060104002b | X0b13060404002b |
| X0b0e070604002b | X0b25070304002b | X0b1907020c002b | X0b160600081516 | X0b1f0601181d1f | X0b00060204002b | X0b13060504002b |
| X0b0e070704002b | X0b25070704002b | X0b1907030c002b | X030e060b180c16 | X031f060c081f20 | X0b00060304002b | X0b13060704002b |
| X0b0f070404002b | X0b26070104002b | X0b1a07030c002b | X0b0e0606180c16 | X0b1f0604081f20 | X0b01060004002b | X0b14060104002b |
| X0b0f070704002b | X0b26070304002b | X0b1a07060c002b | X0b0f0606180c16 | X0b200600081f20 | X0b01060304002b | X0b14060304002b |
| X0b10070404002b | X0b26070404002b | X0b1b07020c002b | X0b110606180c16 | X0309060c06000a | X0b01060404002b | X0b14060404002b |
| X0b10070504002b | X0b26070504002b | X0b1b07060c002b | X0b120606180c16 | X0b07060706000a | X0b01060704002b | X0b14060504002b |
| X0b10070704002b | X0b26070604002b | X0b1c07050c002b | X030d060b080a14 | X0b08060106000a | X0b02060004002b | X0b14060704002b |
| X0b11070704002b | X0b26070704002b | X0b1d07020c002b | X0b0a0602080a14 | X0b09060106000a | X0b02060404002b | X0b15060304002b |
| X0b12070504002b | X0b27070304002b | X0b1d07050c002b | X0b0b0600080a14 | X0b0a060306000a | X0b02060704002b | X0b16060104002b |
| X0b12070704002b | X0b27070404002b | X0b1d07060c002b | X0b0e0600080a14 | X03140608070015 | X0b03060004002b | X0b16060304002b |
| X0b13070404002b | X0b28070004002b | X0b1e07030c002b | X0316060c091517 | X0b090606070015 | X0b03060104002b | X0b16060404002b |
| X0b13070504002b | X0b28070204002b | X0b1e07060c002b | X0b150602091517 | X0b0a0606070015 | X0b03060304002b | X0b17060004002b |
| X0b13070704002b | X0b28070404002b | X0b2007020c002b | X0b150607091517 | X0b100606070015 | X0b03060404002b | X0b17060104002b |
| X0b14070404002b | X0b28070504002b | X0b2007030c002b | X0b160607091517 | X030a060c09000b | X0b03060504002b | X0b17060304002b |
| X0b14070704002b | X0b29070104002b | X0b2007060c002b | V02080600 | X0b07060109000b | X0b03060704002b | X0b17060404002b |
| X0b15070504002b | X0b29070204002b | X0b2307020c002b | X0308060a0e0810 | X0b08060709000b | X0b04060004002b | X0b17060504002b |
| X0b16070104002b | X0b29070304002b | X0b2307060c002b | X0b1006030e0810 | X0b09060709000b | X0b04060104002b | X0b17060704002b |
| X0b16070304002b | X0b29070504002b | X0b2407020c002b | X0319060c071819 | X0b0a060109000b | X0b04060404002b | X0b18060304002b |
| X0b16070404002b | X0b29070604002b | X0b2607020c002b | X0b180602071819 | X0b0b060709000b | X0b05060004002b | X0b19060404002b |
| X0b16070604002b | X0b29070704002b | X0b2707020c002b | X0b180607071819 | X03020609120002 | X0b05060304002b | X0b19060504002b |
| X0b16070704002b | X0b2a070104002b | X0b2807030c002b | X0b190601071819 | X0b010601120002 | X0b05060404002b | X0b1a060104002b |
| X0b17070004002b | X0b2a070404002b | X0b2807070c002b | X0319060b181719 | X0b020603120002 | X0b05060704002b | X0b1a060304002b |
| X0b17070504002b | X0b2a070504002b | X0b2a07020c002b | X0b180601181719 | X0316060a140017 | X0b06060004002b | X0b1a060504002b |
| X0b18070504002b | X0b2a070704002b | X0b2a07060c002b | X0b190607181719 | X030a0608140017 | X0b06060404002b | X0b1b060304002b |
| X0b19070404002b | X0b2b070904002b | X0b2b070a0c002b | V02070600 | X03210609111721 | X0b06060704002b | X0b1b060404002b |
| X0b19070504002b | X0b2b070c04002b | X0b2b070b0c002b | X0307060c100708 | X03170608111721 | X0b07060204002b | X0b1c060104002b |
| X0b19070604002b | X0314070906142b | X031d070c14182b | X0a080600100708 | V02230600 | X0b07060504002b | X0b1d060304002b |
| X0b19070704002b | X0b15070006142b | X0b19070114182b | X0318060c09181a | X0320060b091b23 | X0b07060604002b | X0b1d060404002b |
| X0b1a070504002b | X0b18070006142b | X0b1c070614182b | X0b18060409181a | X0b1d0605091b23 | X0b08060204002b | X0b1e060204002b |
| X0b1b070104002b | X0b1a070006142b | X0b1d070014182b | X0b19060009181a | X0b1e0605091b23 | X0b08060304002b | X0b1e060304002b |
| X0b1b070404002b | X0b1c070006142b | X0b21070014182b | X0318060a0e111a | X0b1f0605091b23 | X0b08060604002b | X0b1f060304002b |
| X0b1b070504002b | X0b1f070006142b | X0b22070014182b | X0b1306060e111a | X0323060c102324 | X0b09060404002b | X0b20060104002b |
| X0b1b070704002b | X0324070c08212b | X0306070917002b | X0b1406060e111a | X0b230602102324 | X0b09060504002b | X0b20060404002b |
| X0b1c070304002b | X0b24070008212b | X0b1a070117002b | X0307060b12060f | X0b230604102324 | X0b0a060404002b | X0b21060004002b |
| X0b1d070304002b | X0a25070108212b | X0b1e070117002b | X0b09060212060f | X0b240600102324 | X0b0a060504002b | X0b21060104002b |
| X0b1d070404002b | X0b27070008212b | X032a070c18242b | X0b0b060612060f | V02250600 | X0b0a060704002b | X0b21060204002b |
| X0b1d070704002b | X0b28070608212b | X0b25070018242b | X0b0f060012060f | X0325060b022325 | X0b0b060104002b | X0b21060304002b |
| X0b1e070004002b | X0b0107060c002b | X0b25070218242b | X031b060c071a1b | X0a230600022325 | X0b0b060204002b | X0b21060404002b |
| X0b1e070204002b | X0b0207060c002b | X0b25070418242b | X0b1a0602071a1b | X0321060c151c25 | X0b0b060304002b | X0b21060504002b |
| X0b1e070404002b | X0b0307060c002b | X0b27070718242b | X0b1a0607071a1b | X0b240607151c25 | X0b0b060504002b | X0b21060704002b |

X0b22060004002b
X0b22060104002b
X0b22060204002b
X0b22060404002b
X0b23060104002b
X0b24060104002b
X0b24060304002b
X0b24060404002b
X0b25060104002b
X0b25060204002b
X0b25060304002b
X0b26060104002b
X0b26060404002b
X0b27060004002b
X0b27060204002b
X0b27060604002b
X0b28060004002b
X0b28060104002b
X0b28060204002b
X0b28060604002b
X0b29060104002b
X0b29060404002b
X0b2a060104002b
X0b2a060404002b
X0312060905122b
X0320060805122b
X0b12060305122b
X0b22060605122b
X0b0006000c002b
X0b0106050c002b
X0b0106060c002b
X0b0206050c002b
X0b0206060c002b
X0b0306060c002b
X0b0406060c002b
X0b0506050c002b
X0b0506060c002b
X0b0606050c002b
X0b0606060c002b
X0b0706030c002b
X0b0706040c002b
X0b0806040c002b
X0b0806050c002b
X0b0906000c002b
X0b0906030c002b
X0b0a06000c002b
X0b0b06040c002b
X0b0c06040c002b
X0b0d06040c002b
X0b0e06020c002b
X0b0f06020c002b
X0b1006000c002b
X0b1106020c002b
X0b1106030c002b
X0b1206010c002b
X0b1206020c002b
X0b1506050c002b
X0b1606020c002b
X0b1606050c002b
X0b1706060c002b
X0b1806050c002b
X0b1906020c002b
X0b1906030c002b
X0b1b06020c002b
X0b1b06050c002b
X0b1d06020c002b
X0b1e06040c002b
X0b1e06060c002b
X0b2006020c002b
X0b2406020c002b
X0b2406050c002b
X0b2506040c002b
X0b2506050c002b
X0b2606020c002b
X0b2706040c002b
X0b2806040c002b
X0b2906020c002b
X0b2a06020c002b
X0b2b060a0c002b
X0b2b060b0c002b
X0b2b060c0c002b
X0320060c0e1e2b
X032b06040e1e2b
X0b1f06020e1e2b
X0b2106060e1e2b
X0329060c15292b
X0b29060015292b
X0b2a060015292b
X0324060918242b
X0b2b060918242b
V02100501
X0310050b051011
X0b100506051011
X0b110506051011
X0310050a060f10
X0a100501060f10
X03100509090f11
X0b100503090f11
X0b100505090f11
X0b110501090f11
X0311050a131112
X0b110500131112
X0b120500131112
X030e050a050e0f
X0b0e0500050e0f
X0b0f0500050e0f
X0312050c111213
X0b120503111213
V020d0501
X03140508091214
X0b120506091214
V02150501
X030c050a050c0d
X0b0c0500050c0d
X0b0d0500050c0d
X030c0509060b0c
X0b0b0507060b0c
X0315050b081516
X0b150500081516
X0314050c080a14
X0b0b0501080a14
X0b0c0506080a14
X0b0d0506080a14
X0b0f0506080a14
X030a05090b0a0c
X0b0c05010b0a0c
X0316050a071617
X0b160502071617
V02180501
X0309050a10090a
X0b09050010090a
X0b0a050010090a
X0317050a081718
X0b170502081718
X0b180502081718
X030805090e0810
X0b0f05010e0810
X0308050a180809
X0b080500180809
X0319050a181719
X0b170506181719
X031a050a08191a
X0b1a050008191a
X0318050b0e111a
X0b1305060e111a
X0b1705000e111a
X0b1805000e111a
V02060501
V021b0501
X030a050a12060f
X0a0d050112060f
X0314050b01101b
X0b14050101101b
X0b17050101101b
X031905090d191b
X0b1a05060d191b
X0a1b05010d191b
X03050509100506
X0b050503100506
X0b060503100506
V021e0501
X031e050c081d1e
X0b1e0506081d1e
V02020501
X031a050913151f
X0a15050113151f
X0b16050613151f
X031f050a081f20
X0b1f0500081f20
X030b050805000b
X0b03050105000b
X030c050b070015
X0b090502070015
X0b0a0502070015
X0b0c0502070015
X0b0d0502070015
X0b0e0502070015
X0b0f0502070015
X0b110502070015
X0b120502070015
X0304050a0b0009
X0b0305000b0009
X0b0405020b0009
X0b0505060b0009
X0b0605060b0009
X0313050b0d0013
X0b0605070d0013
X0b0b05030d0013
X0b0c05030d0013
X0b0f05030d0013
X0b1005070d0013
X0b1305010d0013
X030105090e0003
X0b0105030e0003
X0b0205030e0003
X0302050a120002
X0b010500120002
X0b010506120002
X0b020502120002
X0b020506120002
X03030509180007
X0b010501180007
X0b020500180007
X0a020501180007
X0b040500180007
X0b050501180007
X0a060501180007
X03210508111721
X0b1d0506111721
X0a1e0501111721
X031d050a091b23
X03220508091b23
X0b1d0500091b23
X0325050a092425
X0b250501092425
X031c0508151c25
X0b1f0506151c25
V02270501
X0326050a092627
X0b260500092627
X0b270500092627
X0322050c01222b
X0b24050001222b
X0b28050701222b
X0b00050204002b
X0b00050304002b
X0b01050204002b
X0b01050704002b
X0b02050704002b
X0b03050204002b
X0b03050504002b
X0b03050704002b
X0b04050104002b
X0b04050504002b
X0b04050704002b
X0b05050004002b
X0b06050004002b
X0b06050204002b
X0b07050104002b
X0b07050304002b
X0b07050404002b
X0b07050504002b
X0b07050604002b
X0b07050704002b
X0b08050104002b
X0b08050304002b
X0b08050404002b
X0b08050504002b
X0b08050604002b
X0b08050704002b
X0b09050104002b
X0b09050304002b
X0b09050404002b
X0b09050504002b
X0b09050604002b
X0b09050704002b
X0b0a050104002b
X0b0a050304002b
X0b0a050404002b
X0b0a050504002b
X0b0a050604002b
X0b0a050704002b
X0b0b050004002b
X0b0b050204002b
X0b0b050404002b
X0b0b050504002b
X0b0b050604002b
X0b0c050404002b
X0b0c050504002b
X0b0c050704002b
X0b0d050404002b
X0b0d050704002b
X0b0e050104002b
X0b0e050404002b
X0b0e050504002b
X0b0e050704002b
X0b0f050404002b
X0b0f050504002b
X0b0f050704002b
X0b10050404002b
X0b11050404002b
X0b11050504002b
X0b11050704002b
X0b12050404002b
X0b12050504002b
X0b12050704002b
X0b13050004002b
X0b13050504002b
X0b14050004002b
X0b14050504002b
X0b15050404002b
X0b15050504002b
X0b15050604002b
X0b15050704002b
X0b16050104002b
X0b16050304002b
X0b16050504002b
X0b16050704002b
X0b17050304002b
X0b17050704002b
X0b18050504002b
X0b18050604002b
X0b18050704002b
X0b19050004002b
X0b19050104002b
X0b19050204002b
X0b19050304002b
X0b19050404002b
X0b19050604002b
X0b19050704002b
X0b1a050104002b
X0b1a050304002b
X0b1a050404002b
X0b1a050704002b
X0b1b050004002b
X0b1b050504002b
X0b1b050604002b
X0b1c050104002b
X0b1c050404002b
X0b1c050504002b
X0b1c050704002b
X0b1d050104002b
X0b1d050304002b
X0b1d050404002b
X0b1d050504002b
X0b1d050704002b
X0b1e050004002b
X0b1e050204002b
X0b1e050304002b
X0b1e050404002b
X0b1e050504002b
X0b1e050704002b
X0b1f050104002b
X0b1f050304002b
X0b1f050404002b
X0b1f050504002b
X0b1f050704002b
X0b20050104002b
X0b20050404002b
X0b20050504002b
X0b20050704002b
X0b21050404002b
X0b21050504002b
X0b21050704002b
X0b22050004002b
X0b22050104002b
X0b22050504002b
X0b23050004002b
X0b23050104002b
X0b23050504002b
X0b24050304002b
X0b24050604002b
X0b25050004002b
X0b25050204002b
X0b25050304002b
X0b25050404002b
X0b25050604002b
X0b26050104002b
X0b26050404002b
X0b26050504002b
X0b26050704002b
X0b27050304002b
X0b27050404002b
X0b27050604002b
X0b27050704002b
X0b28050004002b
X0b28050104002b
X0b28050204002b
X0b28050504002b
X0b29050004002b
X0b29050104002b
X0b29050504002b
X0b2a050004002b
X0b2a050104002b
X0b2a050204002b
X0b2a050404002b
X0b2a050504002b
X0b2a050704002b
X0320050a07202b
X0b20050007202b
X0b21050107202b
X0b25050707202b
X0321050a08212b
X0b21050008212b
X0b24050108212b
X0b24050708212b
X0b0005000c002b
X0b0005010c002b
X0b0105040c002b
X0b0105050c002b
X0b0205040c002b
X0b0205050c002b
X0b0305030c002b
X0b0305040c002b
X0b0305060c002b
X0b0405040c002b
X0b0405060c002b
X0b0505050c002b
X0b0605040c002b
X0b0605050c002b
X0b0705020c002b
X0b0805020c002b
X0b0d05030c002b
X0b0d05050c002b
X0b0e05060c002b
X0b1005020c002b
X0b1105030c002b
X0b1205010c002b
X0b1305030c002b
X0b1405030c002b
X0b1405060c002b
X0b1505020c002b
X0b1505030c002b
X0b1605040c002b
X0b1705040c002b
X0b1705050c002b
X0b1805030c002b
X0b1805040c002b
X0b1905050c002b
X0b1a05020c002b
X0b1a05050c002b
X0b1b05030c002b
X0b1c05020c002b
X0b1c05060c002b
X0b1d05020c002b
X0b1f05020c002b
X0b2005020c002b
X0b2005060c002b
X0b2105020c002b
X0b2105030c002b
X0b2105060c002b
X0b2205060c002b
X0b2305060c002b
X0b2405020c002b
X0b2405040c002b
X0b2405050c002b
X0b2505050c002b
X0b2605020c002b
X0b2605060c002b
X0b2705020c002b
X0b2705050c002b
X0b2805040c002b
X0b2805060c002b
X0b2905060c002b
X0b2a05060c002b
X0b2b050b0c002b
X0b2b050c0c002b
X032a050a15292b
X0b2b050a15292b
X0325050918242b
X0b2b050918242b
V02100400
X030f040c060f10
X0a100400060f10
X030f0409090f11
X0b110402090f11
X0312040b111213
X0b130405111213
X030d0409060d0e
X0b0e0402060d0e
X0313040b0b1315
X0b1504070b1315
X031404080d1415
X0b1404070d1415
V02160400
X030b040a060b0c
X0b0c0402060b0c
X0315040a081516
X0b150402081516

X0b160402081516
X030f040b180c16
X0b0e0401180c16
X0b0f0403180c16
X0b100407180c16
X0b110407180c16
X030c040b080a14
X0b0a0402080a14
X0b0d0402080a14
X0b0f0402080a14
X0b120402080a14
V02180400
X030b040902090b
X0b09040202090b
X0317040c081718
X0b170400081718
X03080408180809
X0b080403180809
X0318040a071819
X0b180402071819
V02070400
X0309040b080709
X0b070406080709
X0b080406080709
X0307040a100708
X0b070402100708
X0b070404100708
X0b080400100708
X0319040c08191a
X0b19040008191a
X0312040a0e111a
X0b1104040e111a
X0b1204000e111a
X0b1204070e111a
X0b1a04000e111a
X03080409020608
X0b080401020608
X030604090e0607
X0b0604070e0607
X0306040b12060f
X0b09040712060f
X0316040901101b
X0b19040201101b
V021c0400
V02040400
X0304040a080406
X0b060401080406
X031c040a071c1d
X0b1c0402071c1d
X0b1c0404071c1d
X0b1d0400071c1d
X0303040a120305
X0b030402120305
X0b040402120305
X031f0409071e1f
X0b1c0407071e1f
X0b1f0401071e1f
X031d040913151f
X0b1e040713151f
X0b1b040113151f
X030b040b100b20
X0b150400100b20
X0a160400100b20
X030a040c06000a
X0a07040006000a
X03030409080003
X0b010400080003
X0b020400080003
X0b030400080003
X0302040c0b0009
X0b0804050b0009
X0310040b0d0013
X0b0904060d0013
X0b0a04060d0013
X0b0c04060d0013
X0b0d04060d0013
X0b0e04060d0013
X0b0f04060d0013
X0b1104060d0013
X0b1204060d0013
X0301040a0e0003
X0b0104020e0003
X0b0204020e0003
X031804080f0019
X0b0804070f0019
X03020409100004
X0b030406100004
X0b040406100004
X0311040c110011
X0b090400110011
X0b0c0400110011
X0b0e0400110011
X0b110400110011
X0301040b120002
X0b000400120002
X0b000401120002
X0b010401120002
X031f040a011f21
X0b210401011f21
X031e040a111721
X0b1f0400111721
X0b200404111721
X0b210402111721
X0321040a002123
X03230408002123
X0b210407002123
X03210409091b23
X0b1b0407091b23
X0b1f0407091b23
X0b220407091b23
V02240400
X031e0409151c25
X0b200407151c25
X0b220401151c25
X03260408112526
X0b260400112526
X0326040c092627
X0b260406092627
X0b270406092627
X0327040b102527
X0b260401102527
X0b270403102527
X0327040a152628
X0b270400152628
X0324040a01222b
X0b2b040a01222b
X0b01040603002b
X0b02040603002b
X0b17040603002b
X0b18040603002b
X0b00040204002b
X0b01040504002b
X0b01040704002b
X0b02040104002b
X0b03040104002b
X0b04040104002b
X0b05040004002b
X0b05040104002b
X0b05040404002b
X0b06040004002b
X0b06040204002b
X0b06040404002b
X0b06040604002b
X0b07040104002b
X0b08040404002b
X0b09040104002b
X0b09040304002b
X0b09040504002b
X0b0a040404002b
X0b0a040504002b
X0b0b040004002b
X0b0b040104002b
X0b0b040204002b
X0b0b040304002b
X0b0b040504002b
X0b0b040704002b
X0b0c040104002b
X0b0c040304002b
X0b0c040504002b
X0b0c040704002b
X0b0d040104002b
X0b0d040304002b
X0b0d040404002b
X0b0d040504002b
X0b0d040704002b
X0b0e040304002b
X0b0e040704002b
X0b0f040404002b
X0b0f040704002b
X0b10040104002b
X0b10040204002b
X0b10040304002b
X0b10040404002b
X0b10040504002b
X0b10040604002b
X0b11040104002b
X0b11040304002b
X0b11040504002b
X0b12040304002b
X0b12040404002b
X0b13040004002b
X0b13040304002b
X0b13040404002b
X0b14040004002b
X0b14040104002b
X0b14040304002b
X0b14040404002b
X0b14040504002b
X0b15040104002b
X0b15040304002b
X0b15040504002b
X0b17040204002b
X0b17040304002b
X0b18040104002b
X0b18040304002b
X0b18040504002b
X0b18040704002b
X0b19040304002b
X0b19040504002b
X0b1a040104002b
X0b1a040304002b
X0b1a040404002b
X0b1b040004002b
X0b1b040404002b
X0b1c040104002b
X0b1d040304002b
X0b1d040404002b
X0b1d040504002b
X0b1e040104002b
X0b1e040304002b
X0b1e040404002b
X0b1f040204002b
X0b20040104002b
X0b20040204002b
X0b20040304002b
X0b21040404002b
X0b21040504002b
X0b22040004002b
X0b22040404002b
X0b23040004002b
X0b23040104002b
X0b23040404002b
X0b24040104002b
X0b24040204002b
X0b24040304002b
X0b24040504002b
X0b24040604002b
X0b24040704002b
X0b25040004002b
X0b25040104002b
X0b25040204002b
X0b25040604002b
X0b26040304002b
X0b26040404002b
X0b26040704002b
X0b27040404002b
X0b27040504002b
X0b27040704002b
X0b28040104002b
X0b28040204002b
X0b28040304002b
X0b28040504002b
X0b28040604002b
X0b28040704002b
X0b29040004002b
X0b29040304002b
X0b29040404002b
X0b29040704002b
X0b2a040204002b
X0b2a040504002b
X0b2a040704002b
X030a040a0a002b
X0b0904040a002b
X0b0a04c00a002b
X0b0a04070a002b
X0b0b04060a002b
X0b1304070a002b
X0b1604070a002b
X0b1704070a002b
X0b1904070a002b
X0b1d04070a002b
X0b1e04000a002b
X0b0004030c002b
X0b0104030c002b
X0b0104040c002b
X0b0204040c002b
X0b0304040c002b
X0b0404040c002b
X0b0504060c002b
X0b0604030c002b
X0b0604050c002b
X0b0804020c002b
X0b0a04030c002b
X0b0b04040c002b
X0b0e04050c002b
X0b0f04050c002b
X0b1204050c002b
X0b1304060c002b
X0b1404060c002b
X0b1504040c002b
X0b1604030c002b
X0b1604040c002b
X0b1604050c002b
X0b1704040c002b
X0b1704050c002b
X0b1804040c002b
X0b1904040c002b
X0b1904060c002b
X0b1a04020c002b
X0b1a04050c002b
X0b1b04030c002b
X0b1b04050c002b
X0b1b04060c002b
X0b1d04020c002b
X0b1e04020c002b
X0b1e04050c002b
X0b1e04060c002b
X0b1f04030c002b
X0b1f04050c002b
X0b2004050c002b
X0b2104030c002b
X0b2204030c002b
X0b2204050c002b
X0b2204060c002b
X0b2304060c002b
X0b2404040c002b
X0b2504040c002b
X0b2604020c002b
X0b2604050c002b
X0b2704020c002b
X0b2804040c002b
X0b2904050c002b
X0b2904060c002b
X0b2a04040c002b
X0b2a04060c002b
X0b2b04090c002b
X0b2b040b0c002b
X0b2b040c0c002b
X0311040b12102b
X0b15040612102b
X0b16040612102b
X0b1a040612102b
X0b1c040612102b
X0b1d040612102b
X0b1f040612102b
X0b20040612102b
X0b21040612102b
X032a040b15292b
X0b29040115292b
X0b2a040015292b
X0b2a040315292b
X030d040a16002b
X0b0c040416002b
X0b0d040016002b
X0b12040116002b
X0b16040116002b
X0b17040116002b
X0b19040116002b
X0b1d040116002b
X0b20040016002b
X0b21040016002b
X030f040a17002b
X0b0a040117002b
X0b0e040417002b
X0b0f040017002b
X0b13040117002b
X0a1c040017002b
X0b1f040417002b
X0325040a18242b
X0325040818242b
X0b28040018242b
X0310030c051011
X0b110304051011
V020f0301
X030e030b050e0f
X0b0e0303050e0f
X0b0f0303050e0f
X03120309111213
X0b130300111213
X030e030c0b0d0f
X0b0d03000b0d0f
X0b0e03020b0d0f
X0b0e03060b0d0f
X0b0f03060b0d0f
V02160301
X030b030c060b0c
X0b0b0302060b0c
X0b0c0302060b0c
X0316030b081516
X0b160307081516
X0314030c180c16
X0b0f0307180c16
V02170301
X030c030b0b0a0c
X0b0a03020b0a0c
X030a030c10090a
X0b09030210090a
X0b0a030010090a
V02080301
V02190301
X030d030b0e0810
X0b0b03000e0810
X0b0c03000e0810
X0b0e03000e0810
X0b0e03010e0810
X0a0f03010e0810
X0308030c180809
X0b080300180809
X0b090300180809
X0318030b071819
X0b180300071819
X0b190300071819
X03070308080709
X0b080303080709
X0307030c100708
X0b070300100708
X0b080302100708
X0b080304100708
X0319030c08191a
X0b19030208191a
V02060301
V021b0301
X0306030c0e0607
X0b0603020e0607
X030d030912060f
X0b09030412060f
X0306030a100506
X0b050300100506
V021d0301
X031d030b0e1b1d
X0b1b03070e1b1d
V021f0301
X0319030a13151f
X0b170307131 51f
X0b1e030713151f
X030a030b06000a
X0b010301060 00a
X0301030b080003
X0b000301080003
X030203090b0009
X0b0803050b0009
X030003050e0003
X0b0203020e0003
X0310030b110011
X0b010306110011
X03000306120002
X0b020304120002
X0321030e011f21
X0b1f0307011f21
X0b200304011f21
X031a030a111721
X0b210306111721
V02220301
X0324030b102324
X0b240304102324
X03220309112224
X0b220307112224
X0b230304112224
X0b240301112224
X031e030c151c25
X0b200300151c25
X0b220300151c25
X0b230300151c25
X0b240300151c25
X03260309002426
X0b240306002426
V02270301
X0326030e092627
X0b260302092627
X0b260306092627
X0b270304092627
X0b270306092627
X0326030b152628
X0b260301152628
X0b270303152628
V022a0301
X0328030b02262b
X0b26030002262b
X0b26030302262b
X0a27030102262b
X0b28030002262b
X0b29030302262b
X0b2a030002262b
X0a2a030102262b
X0b00030204002b
X0b01030004002b
X0b01030304002b
X0b02030104002b
X0b02030504002b

X0b02030704002b
X0b03030004002b
X0b03030104002b
X0b03030504002b
X0b04030004002b
X0b04030104002b
X0b04030504002b
X0b05030104002b
X0b05030204002b
X0b05030504002b
X0b05030704002b
X0b06030304002b
X0b06030504002b
X0b06030604002b
X0b06030704002b
X0b07030104002b
X0b07030404002b
X0b07030504002b
X0b07030704002b
X0b08030604002b
X0b08030704002b
X0b09030104002b
X0b09030304002b
X0b09030604002b
X0b09030704002b
X0b0a030104002b
X0b0a030304002b
X0b0a030404002b
X0b0a030504002b
X0b0a030604002b
X0b0a030704002b
X0b0b030504002b
X0b0b030704002b
X0b0c030504002b
X0b0c030704002b
X0b0d030204002b
X0b0d030504002b
X0b0d030704002b
X0b0e030704002b
X0b0f030004002b
X0b0f030204002b
X0b0f030404002b
X0b10030104002b
X0b10030204002b
X0b10030304002b
X0b10030604002b
X0b10030704002b
X0b11030104002b
X0b11030204002b
X0b11030304002b
X0b11030604002b
X0b11030704002b
X0b12030004002b
X0b12030104002b
X0b12030304002b
X0b12030504002b
X0b12030604002b
X0b13030104002b
X0b13030204002b
X0b13030304002b
X0b13030504002b
X0b13030604002b
X0b13030704002b
X0b14030004002b
X0b14030104002b
X0b14030204002b
X0b14030304002b
X0b14030404002b
X0b14030604002b
X0b14030704002b
X0b15030004002b
X0b15030104002b
X0b15030204002b
X0b15030304002b
X0b15030604002b
X0b15030704002b
X0b16030004002b
X0b16030204002b
X0b16030404002b
X0b16030504002b
X0b16030604002b
X0b17030004002b
X0b17030204002b
X0b17030604002b
X0b18030504002b
X0b18030704002b
X0b19030404002b
X0b19030604002b
X0b19030704002b
X0b1a030004002b
X0b1a030204002b
X0b1a030304002b
X0b1a030404002b
X0b1a030604002b
X0b1a030704002b
X0b1b030004002b
X0b1b030204002b
X0b1b030304002b
X0b1b030404002b
X0b1b030604002b
X0b1c030004002b
X0b1c030104002b
X0b1c030204002b
X0b1c030404002b
X0b1c030504002b
X0b1c030704002b
X0b1d030004002b
X0b1d030504002b
X0b1d030604002b
X0b1e030004002b
X0b1e030204002b
X0b1e030304002b
X0b1e030404002b
X0b1e030604002b
X0b1f030004002b
X0b1f030204002b
X0b1f030304002b
X0b1f030604002b
X0b20030204002b
X0b20030304002b
X0b20030604002b
X0b20030704002b
X0b21030004002b
X0b21030104002b
X0b21030204002b
X0b21030304002b
X0b21030404002b
X0b21030704002b
X0b22030204002b
X0b22030304002b
X0b22030604002b
X0b23030104002b
X0b23030204002b
X0b23030504002b
X0b23030704002b
X0b24030204002b
X0b24030504002b
X0b24030704002b
X0b25030104002b
X0b25030204002b
X0b25030504002b
X0b25030704002b
X0b26030404002b
X0b26030504002b
X0b26030704002b
X0b27030204002b
X0b27030504002b
X0b27030704002b
X0b28030404002b
X0b28030504002b
X0b28030704002b
X0b29030204002b
X0b29030504002b
X0b29030704002b
X0b2a030404002b
X0b2a030504002b
X0b2a030704002b
X0328030a09282b
X0b2b030a09282b
X032a03090a002b
X030b03080a002b
X0b0b03010a002b
X0b0c03010a002b
X0b0d03010a002b
X0b1803010a002b
X0b2803010a002b
X0321030b0b162b
X031603080b162b
X0b1a03010b162b
X0b1e03010b162b
X0b2003010b162b
X0b0003000c002b
X0b0003030c002b
X0b0103050c002b
X0b0203060c002b
X0b0303060c002b
X0b0403060c002b
X0b0503040c002b
X0b0503060c002b
X0b0603040c002b
X0b0703020c002b
X0b0703060c002b
X0b0903050c002b
X0b0b03030c002b
X0b0b03040c002b
X0b0b03060c002b
X0b0c03030c002b
X0b0c03040c002b
X0b0c03060c002b
X0b0d03030c002b
X0b0d03040c002b
X0b0d03060c002b
X0b0e03040c002b
X0b0e03050c002b
X0b0f03050c002b
X0b1003040c002b
X0b1003050c002b
X0b1103050c002b
X0b1303040c002b
X0b1403050c002b
X0b1503040c002b
X0b1503050c002b
X0b1603030c002b
X0b1703030c002b
X0b1703040c002b
X0b1703050c002b
X0b1803020c002b
X0b1803030c002b
X0b1803040c002b
X0b1803060c002b
X0b1903030c002b
X0b1903050c002b
X0b1a03050c002b
X0b1b03050c002b
X0b1c03060c002b
X0b1d03030c002b
X0b1e03050c002b
X0b1f03040c002b
X0b1f03050c002b
X0b2003050c002b
X0b2103050c002b
X0b2203040c002b
X0b2203050c002b
X0b2303060c002b
X0b2403030c002b
X0b2503040c002b
X0b2503060c002b
X0b2803030c002b
X0b2803060c002b
X0b2903040c002b
X0b2b03090c002b
X0b2b030b0c002b
X0b2b030c0c002b
X032a030c10282b
X0b29030010282b
X0b29030610282b
X0b2a030210282b
X0b2a030610282b
X0329030b15292b
X0b29030115292b
X0b2a030315292b
X0328030c18242b
X0b25030018242b
X0b27030018242b
X0b28030218242b
V02100200
V02110200
X03100208060f10
X0b100207060f10
V020e0200
X03120209111213
X0b130202111213
X030d020e060d0e
X0b0d0202060d0e
X0b0e0202060d0e
X030f020c0b0d0f
X0b0d02030b0d0f
X0b0e02030b0d0f
X030d020b050c0d
X0b0c0200050c0d
X0b0d0200050c0d
X0315020e0d1415
X0b1502010d1415
X0314020a180c16
X0b0f0200180c16
X0b110206180c16
X0b130206180c16
X030a020c080a14
X0b0d0201080a14
V02180200
X0309020b02090b
X0b09020602090b
X0b0a020602090b
X0309020c10090a
X0b09020010090a
X0b0a020010090a
V02080200
V02190200
X030c020c0e0810
X0b0b02000e0810
X0b0c02020e0810
X0b0d02060e0810
X0b0e02060e0810
X0318020c071819
X0b180202071819
X0b190202071819
X0308020b100708
X0b070200100708
X0319020b08191a
X0b19020108191a
X0316020a0e111a
X0a1102000e111a
X0b1102070e111a
X0b1402000e111a
X0b1502070e111a
V02060200
X0306020c0e0607
X0b0702070e0607
X030c020b12060f
X0b09020212060f
X0b0a020212060f
X0319020a01101b
X0b10020601101b
X0b12020101101b
X0b14020601101b
X0b15020001101b
X0305020c100506
X0b050202100506
X0b060202100506
X031c020a000e1d
X0a100200000e1d
X0b120207000e1d
X0b140202000e1d
X0b150206000e1d
X0b1a0200000e1d
X0b1a0207000e1d
X031e020b011c1e
X0b1c0207011c1e
V02020200
X0314020b020c1f
X0b130207020c1f
X0b170200020c1f
X0b180206020c1f
X0b190206020c1f
X0b1c0200020c1f
X031f020b071e1f
X0b1f0207071e1f
X0315020b13151f
X0b16020013151f
X0b19020713151f
X0b1b020013151f
X031e0209001e20
X0b1e0203001e20
X0b1f0200001e20
X0b200206001e20
X0320020b081f20
X0b200207081f20
X030b020b05000b
X0b05020005000b
X0a06020005000b
X03000207080003
X0b020202080003
X030002040e0003
X0b0202040e0003
X03000206120002
X0b020205120002
X0306020b13000d
X0b05020613000d
X0b06020613000d
X0b07020613000d
X0b08020613000d
X0b0b020613000d
X0b0c020613000d
X031b020b111721
X0b180207111721
X0321020c182021
X0b200200182021
X0322020c102122
X0b210205102122
X03220209002123
X03210208002123
X0b210202002123
X0b220203002123
X0b230200002123
X0320020c091b23
X0b1d0205091b23
X0324020b102324
X0b240200102324
X0323020c022325
X0b250205022325
X031e020c151c25
X0b1f0202151c25
X0b200202151c25
X0b220202151c25
X0b230202151c25
X0b240202151c25
X0325020c112526
X0b250200112526
X0b260202112526
X0327020c152628
X0b270200152628
X0b280202152628
X0327020b00272b
X0b29020600272b
X0b2a020600272b
X0324020c01222b
X0b27020501222b
X0b00020204002b
X0b01020004002b
X0b01020104002b
X0b01020404002b
X0b02020304002b
X0b03020004002b
X0b03020404002b
X0b03020704002b
X0b04020004002b
X0b04020404002b
X0b04020704002b
X0b05020104002b
X0b06020104002b
X0b07020204002b
X0b08020404002b
X0b08020704002b
X0b09020104002b
X0b09020404002b
X0b0a020104002b
X0b0a020404002b
X0b0b020204002b
X0b0b020704002b
X0b0c020704002b
X0b0d020504002b
X0b0d020704002b
X0b0e020504002b
X0b0e020704002b
X0b0f020404002b
X0b0f020604002b
X0b0f020704002b
X0b10020204002b
X0b10020404002b
X0b11020104002b
X0b11020204002b
X0b11020304002b
X0b11020404002b
X0b12020004002b
X0b12020404002b
X0b14020404002b
X0b14020704002b
X0b15020204002b
X0b15020304002b
X0b16020104002b
X0b16020204002b
X0b16020604002b
X0b17020404002b
X0b17020604002b
X0b18020404002b
X0b19020404002b
X0b19020504002b
X0b1a020204002b
X0b1a020504002b
X0b1b020204002b
X0b1b020604002b
X0b1b020704002b
X0b1c020204002b
X0b1d020004002b
X0b1d020104002b
X0b1d020304002b
X0b1d020404002b
X0b1d020704002b
X0b1e020004002b
X0b1e020204002b
X0b1e020504002b
X0b1a020604002b
X0b1e020704002b
X0b1f020604002b
X0b21020104002b
X0b21020304002b
X0b21020404002b
X0b21020704002b
X0b22020504002b
X0b22020604002b
X0b22020704002b
X0b24020704002b
X0b25020104002b
X0b25020304002b
X0b25020404002b
X0b25020704002b
X0b26020404002b
X0b26020504002b
X0b26020704002b

| | | | | | | |
|---|---|---|---|---|---|---|
| X0b27020104002b | X0b1c02040c002b | X0316010c081516 | X0b220103102122 | X0b13010704002b | X0b0801050c002b | X030b000b0a0810 |
| X0b27020304002b | X0b1c02050c002b | X0b150102081516 | X0322010b182223 | X0b14010404002b | X0b0901060c002b | X0b0900020a0810 |
| X0b27020404002b | X0b1c02060c002b | X03150109111416 | X0b230106182223 | X0b14010604002b | X0b0a01060c002b | X0b0a00020a0810 |
| X0b27020704002b | X0b1d02060c002b | X0b150104111416 | V02260101 | X0b14010704002b | X0b0b01050c002b | X0b0b00020a0810 |
| X0b28020404002b | X0b1e02040c002b | X030c010a080a14 | X03250109112526 | X0b15010604002b | X0b0c01050c002b | X0b0c00020a0810 |
| X0b28020504002b | X0b1f02040c002b | X0b0b0102080a14 | X0b250101112526 | X0b15010704002b | X0b0d01020c002b | X0318000a00181a |
| X0b28020704002b | X0b1f02050c002b | X0b0c0100080a14 | X0b260103112526 | X0b16010104002b | X0b0f01050c002b | X0b18000000181a |
| X0b29020404002b | X0b2002040c002b | X0b0d0107080a14 | V02250101 | X0b16010404002b | X0b1001050c002b | X0b19000200181a |
| X0b29020504002b | X0b2002050c002b | X0b0e0100080a14 | X03270109152628 | X0b16010504002b | X0b1001060c002b | X031a000c0b191b |
| X0b29020704002b | X0b2202000c002b | X0b0e0106080a14 | X0b270101152628 | X0b16010704002b | X0b1101020c002b | X0b1a00020b191b |
| X0b2a020404002b | X0b2202040c002b | X030b010b0b0a0c | X0b280103152628 | X0b17010404002b | X0b1201050c002b | V021c0000 |
| X0b2a020504002b | X0b2302040c002b | X0b0a01020b0a0c | X0b1d010603002b | X0b18010704002b | X0b1301050c002b | X031b000a011a1c |
| X0b2a020704002b | X0b2302050c002b | X0b0c01020b0a0c | X0b1e010603002b | X0b19010104002b | X0b1301060c002b | X0b1b0000011a1c |
| X0b2b020a04002b | X0b2302070c002b | X0316010a071617 | X0b21010603002b | X0b19010304002b | X0b1401050c002b | X0b1c0002011a1c |
| X0328020a08212b | X0b2402040c002b | X0b160102071617 | X0b22010603002b | X0b19010404002b | X0b1501010c002b | X030f000a0d0c1f |
| X0b25020608212b | X0b2402050c002b | X0315010b091517 | X0b25010603002b | X0b19010504002b | X0b1501050c002b | X0b1300060d0c1f |
| X0b26020608212b | X0b2b02090c002b | X0b170107091517 | X0b26010603002b | X0b19010604002b | X0b1601060c002b | X0b1400060d0c1f |
| X0b27020608212b | X0b2b020b0c002b | X0317010b081718 | X0b27010603002b | X0b19010704002b | X0b1701020c002b | X0b1500060d0c1f |
| X0b28020608212b | X0b2b020c0c002b | X0b170100081718 | X0b28010603002b | X0b1a010204002b | X0b1701050c002b | X0b1600060d0c1f |
| X032b02040a002b | X032802090d1c2b | X030a010a0e0810 | X0b00010204002b | X0b1a010304002b | X0b1801050c002b | X0b1800060d0c1f |
| X0b0202010a002b | X031d02080d1c2b | X0b0901020e0810 | X0b01010004002b | X0b1a010604002b | X0b1801060c002b | X0b1900060d0c1f |
| X0b0202060a002b | X0b2102000d1c2b | X0b0a01000e0810 | X0b01010104002b | X0b1b010604002b | X0b1a01010c002b | X0b1b00060d0c1f |
| X0b0002000c002b | X0b2402060d1c2b | X0a0e01010e0810 | X0b01010504002b | X0b1b010704002b | X0b1a01040c002b | X0b1c00060d0c1f |
| X0b0002010c002b | X0b2802030d1c2b | X0b0e01020e0810 | X0b02010004002b | X0b1c010404002b | X0b1a01050c002b | X0b01000004002b |
| X0b0002030c002b | X032602090f1a2b | X03190109071819 | X0b02010304002b | X0b1c010704002b | X0b1b01050c002b | X0b01000404002b |
| X0b0102060c002b | X031c02080f1a2b | X0b180102071819 | X0b02010604002b | X0b1d010004002b | X0b1c01050c002b | X0b02000004002b |
| X0b0302050c002b | X0b2102060f1a2b | X0319010a08191a | X0b03010004002b | X0b1d010504002b | X0b1c01060c002b | X0b02000404002b |
| X0b0302060c002b | X0b2302060f1a2b | X0b19010208191a | X0b04010004002b | X0b1e010004002b | X0b1f01050c002b | X0b03000004002b |
| X0b0402050c002b | X0b2602030f1a2b | X0b1a010708191a | X0b04010604002b | X0b1e010504002b | X0b1f01060c002b | X0b03000404002b |
| X0b0402060c002b | X0329020c15292b | X031a010a09181a | X0b05010004002b | X0b1f010004002b | X0b2001050c002b | X0b04000004002b |
| X0b0502040c002b | X0b29020015292b | X0b18010409181a | X0b05010104002b | X0b20010004002b | X0b2001060c002b | X0b04000404002b |
| X0b0602040c002b | X0b2a020215292b | X0317010a0e111a | X0b05010504002b | X0b21010004002b | X0b2301050c002b | X0b05000004002b |
| X0b0702040c002b | X0320020817002b | X0b1301020e111a | X0b06010004002b | X0b21010504002b | X0b2401050c002b | X0b05000404002b |
| X0b0702050c002b | X0a02020017002b | X030e010912060f | X0b06010104002b | X0b22010004002b | X0b2901040c002b | X0b06000004002b |
| X0b0802020c002b | X0b02020717002b | X0b09010412060f | X0b06010504002b | X0b22010504002b | X0b2b010b0c002b | X0b06000404002b |
| X0b0802050c002b | X0328020b18242b | X0311010a01101b | X0b07010004002b | X0b23010004002b | X0b2b010c0c002b | X0b07000004002b |
| X0b0b02040c002b | X0b25020218242b | X0b13010001101b | X0b08010004002b | X0b24010004002b | X031c010c0d1c2b | X0b07000404002b |
| X0b0b02050c002b | X0b26020018242b | X0b15010001101b | X0b08010604002b | X0b24010604002b | X0b1d01030d1c2b | X0b08000004002b |
| X0b0c02040c002b | X0b27020218242b | X0b18010001101b | X0b09010104002b | X0b25010004002b | X0a1e01010d1c2b | X0b08000404002b |
| X0b0c02050c002b | X0b28020018242b | X0b1b010001101b | X0b09010504002b | X0b25010504002b | X0b2101030d1c2b | X0b09000404002b |
| X0b0d02040c002b | X0b29020218242b | X031a0109071a1b | X0b09010704002b | X0b26010004002b | X0a2201010d1c2b | X0b0a000404002b |
| X0b0e02040c002b | X0b2a020018242b | X0b1b0104071a1b | X0b0a010104002b | X0b26010504002b | X0b2501030d1c2b | X0b0b000404002b |
| X0b0f02020c002b | X0311010c051011 | X031b010c081b1c | X0b0a010404002b | X0b27010004002b | X0a2601010d1c2b | X0b0c000404002b |
| X0b0f02050c002b | X0b110100051011 | X0b1b0102081b1c | X0b0a010504002b | X0b27010504002b | X0b2701030d1c2b | X0b0d000004002b |
| X0b1002050c002b | V02120101 | X031a010c181a1c | X0b0a010704002b | X0b28010004002b | X0a2801010d1c2b | X0b0d000204002b |
| X0b1102050c002b | X030f010b060f10 | X0b1a0100181a1c | X0b0b010604002b | X0b28010204002b | X0329010a15292b | X0b0d000404002b |
| X0b1202030c002b | X0b0f0107060f10 | X031c010a071c1d | X0b0b010704002b | X0b28010404002b | X0b2b010a15292b | X0b0d000604002b |
| X0b1202050c002b | X03110109131112 | X0b1c0102071c1d | X0b0c010404002b | X0b28010504002b | V02140000 | X0b0e000004002b |
| X0b1202060c002b | X0b120103131112 | V021e0101 | X0b0c010604002b | X0b29010004002b | X0313000a001214 | X0b0e000204002b |
| X0b1302000c002b | V020e0101 | X031d0109081d1e | X0b0c010704002b | X0b29010204002b | X0b130000001214 | X0b0e000404002b |
| X0b1302040c002b | X0313010b061113 | X0b1d0101081d1e | X0b0d010304002b | X0b29010504002b | X0b140002001214 | X0b0e000604002b |
| X0b1302050c002b | X0b110107061113 | X0b1e0103081d1e | X0b0d010404002b | X0b29010604002b | V02160000 | X0b0f000004002b |
| X0b1402050c002b | X0313010c111213 | V02020101 | X0b0e010304002b | X0b2a010004002b | X030b000a0b0a0c | X0b0f000204002b |
| X0b1502040c002b | X0b130104111213 | X0308010c05000b | X0b0e010404002b | X0b2a010504002b | X0b0b00000b0a0c | X0b0f000604002b |
| X0b1502050c002b | V020d0101 | X0b09010005000b | X0b0e010704002b | X0b2a010604002b | X0b0c00000b0a0c | X0b10000004002b |
| X0b1602040c002b | X030e010a060d0e | X0b0b010005000b | X0b0f010004002b | X0b2b010904002b | X0315000a001517 | X0b10000404002b |
| X0b1702020c002b | X0b0d0106060d0e | X03030109080003 | X0b0f010204002b | X0329010909282b | X0b150000001517 | X0b11000004002b |
| X0b1702050c002b | X030f010c0b0d0f | X0b020105080003 | X0b0f010404002b | X0b28010709282b | X0b160002001517 | X0b11000204002b |
| X0b1702070c002b | X0b0d01000b0d0f | X0301010b0e0003 | X0b0f010604002b | X0b29010709282b | X0309000a0d090b | X0b11000604002b |
| X0b1802050c002b | X0b0d01050b0d0f | X0b0001000e0003 | X0b10010004002b | X0b0001030c002b | X0b0900000d090b | X0b12000004002b |
| X0b1902030c002b | X0b0e01050b0d0f | X0b0001010e0003 | X0b11010104002b | X0b0101060c002b | X0b0a00000d090b | X0b12000404002b |
| X0b1a02010c002b | X0314010a131314 | X0b0301050e0003 | X0b11010304002b | X0b0301060c002b | V02190000 | X0b13000404002b |
| X0b1a02030c002b | X0b140102131314 | X031a010b111721 | X0b11010404002b | X0b0401050c002b | X0309000b01080d | X0b14000404002b |
| X0b1a02040c002b | X0315010c0d1415 | X0b170106111721 | X0b11010504002b | X0b0501060c002b | X0b09000601080d | X0b15000404002b |
| X0b1a02060c002b | X0b1501030d1415 | V02220101 | X0b11010604002b | X0b0601060c002b | X0b0a000601080d | X0b16000404002b |
| X0b1b02040c002b | X030d010e000b0d | X03210109102122 | X0b12010004002b | X0b0701050c002b | X0b0b000601080d | X0b17000004002b |
| X0b1b02050c002b | X0b0b0104000b0d | X0b210101102122 | X0b12010604002b | X0b0701060c002b | X0b0c000601080d | X0b17000204002b |

```
X0b17000404002b
X0b17000604002b
X0b18000404002b
X0b19000404002b
X0b1a000604002b
X0b1b000404002b
X0b1c000404002b
X0b1d000004002b
X0b1d000404002b
X0b1e000004002b
X0b1e000404002b
X0b1f000004002b
X0b1f000404002b
X0b20000004002b
X0b20000404002b
X0b21000004002b
X0b21000404002b
X0b22000004002b
X0b22000404002b
X0b23000004002b
X0b23000404002b
X0b24000004002b
X0b24000404002b
X0b25000004002b
X0b25000404002b
X0b26000004002b
X0b26000404002b
X0b27000004002b
X0b27000404002b
X0b28000004002b
X0b28000204002b
X0b28000604002b
X0b29000004002b
X0b29000204002b
X0b29000404002b
X0b29000604002b
X0b2a000004002b
X0b2a000404002b
X0318000b06122b
X0b13000206122b
X0a14000006122b
X0b15000206122b
X0a16000006122b
X0b18000206122b
X0a19000006122b
X0b1b000206122b
X0a1c000006122b
X0b0000010c002b
X0b0000030c002b
X0b0100060c002b
X0b0200060c002b
X0b0300060c002b
X0b0400060c002b
X0b0500060c002b
X0b0600060c002b
X0b0700060c002b
X0b0800060c002b
X0b0f00040c002b
X0b1000060c002b
X0b1100040c002b
X0b1200060c002b
X0b1a00000c002b
X0b1a00040c002b
X0b1d00060c002b
X0b1e00060c002b
X0b1f00060c002b
X0b2000060c002b
X0b2100060c002b
X0b2200060c002b
X0b2300060c002b
X0b2400060c002b
X0b2500060c002b
X0b2600060c002b
X0b2700060c002b
X0b2800040c002b
X0b2a00060c002b
X0b2b00090c002b
X0b2b000b0c002b
X03100c08051011
X0b100c01051011
V02120b01
X03100c0a060f10
X0b100c07060f10
X03120c0c0b1012
X0b100c060b1012
V020e0b01
V020d0b01
X030e0c0c060d0e
X0b0e0c07060d0e
X03140c09091214
X0b120c06091214
X03130c0a131314
X0b130c02131314
X0b140c02131314
X030d0c0c050c0d
X0b0c0c06050c0d
X03140c0a0d1415
X0b150c010d1415
X030d0c09000b0d
X0b0b0c07000b0d
X0b0c0c02000b0d
X0b0d0c07000b0d
X030c0c0c060b0c
X0b0c0c00060b0c
X03160c0c180c16
X0b0d0c06180c16
X030b0c08080a14
X0b0c0c07080a14
X0b0f0c07080a14
X0b130c07080a14
V02090b01
V02180b01
X03170c0a081718
X0b170c02081718
X0b180c02081718
X03180c0c0d1618
X0b160c060d1618
X03170c0b181719
X0b170c03181719
X0b180c03181719
V021a0b01
X03070c0a100708
X0b070c02100708
X0b080c02100708
X03190c0c08191a
X0b1a0c0608191a
X03120c0b0e111a
X0b120c030e111a
X0b190c070e111a
V021b0b01
X03180c0a01101b
X0b130c0601101b
X0b140c0601101b
X0b160c0701101b
X031a0c0b071a1b
X0b1a0c05071a1b
X0b1b0c05071a1b
V021c0b01
X031b0c0a081b1c
X0b1b0c02081b1c
X0b1c0c02081b1c
V021d0b01
X030f0c0a000e1d
X0b130c00000e1d
X0b140c00000e1d
X0b170c00000e1d
X0b170c01000e1d
X0b180c00000e1d
X0a180c01000e1d
X0b1b0c00000e1d
X0b1c0c00000e1d
X031c0c0b071c1d
X0a1d0c01071c1d
V021e0b01
X03030c0a120305
X0b030c02120305
X0b040c02120305
X031e0c0b081d1e
X0b1d0c07081d1e
V021f0b01
X031e0c0c071e1f
X0a1e0c01071e1f
X031e0c0a13151f
X0b150c0713151f
X0b170c0613151f
X0b180c0613151f
X0b190c0613151f
X031f0c0a081f20
X0b1f0c00081f20
X0b200c04081f20
X030f0c0901000f
X0b030c0001000f
X0b040c0001000f
X0b070c0001000f
X0b080c0001000f
X0b0f0c0001000f
X030a0c0906000a
X0b050c0706000a
X0b070c0606000a
X0b070c0706000a
X0b080c0606000a
X0b0a0c0706000a
X03080c090b0009
X0b030c060b0009
X0b040c060b0009
X0b040c070b0009
X0b080c070b0009
X03050c0b110011
X0b0e0c03110011
X03180c0b111721
X0b190c00111721
X0b1b0c06111721
X0b1c0c06111721
X03230c09002123
X0b210c06002123
X03230c0c091b23
X0b1d0c06091b23
X03230c0a102324
X0b230c00102324
X0b240c04102324
X031f0c0c151c25
X0b1f0c04151c25
X0b200c00151c25
X09210c01151c25
X0b230c04151c25
X0b240c00151c25
V02260b01
X03250c0c112526
X0b250c06112526
X03260c0b01222b
X0b230c0701222b
X0b240c0701222b
X0b250c0101222b
X0b260c0501222b
X0b000c0004002b
X0b000c0204002b
X0b000c0304002b
X0b010c0104002b
X0b010c0604002b
X0b020c0104002b
X0b020c0604002b
X0b030c0104002b
X0b040c0104002b
X0b040c0304002b
X0b040c0504002b
X0b050c0104002b
X0b050c0304002b
X0b050c0504002b
X0b060c0104002b
X0b070c0104002b
X0b070c0304002b
X0b070c0504002b
X0b080c0104002b
X0b080c0304002b
X0b080c0504002b
X0b090c0304002b
X0b090c0704002b
X0b0a0c0104002b
X0b0a0c0304002b
X0b0b0c0004002b
X0b0b0c0104002b
X0b0b0c0304002b
X0b0b0c0404002b
X0b0c0c0104002b
X0b0c0c0304002b
X0b0c0c0404002b
X0b0d0c0504002b
X0b0e0c0504002b
X0b0f0c0104002b
X0b0f0c0304002b
X0b0f0c0404002b
X0b100c0004002b
X0b100c0204002b
X0b100c0304002b
X0b100c0404002b
X0b110c0404002b
X0b110c0504002b
X0b110c0604002b
X0b110c0704002b
X0b120c0504002b
X0b120c0704002b
X0b130c0104002b
X0b130c0304002b
X0b130c0504002b
X0b140c0104002b
X0b140c0304002b
X0b140c0704002b
X0b150c0504002b
X0b150c0604002b
X0b160c0104002b
X0b160c0304002b
X0b170c0704002b
X0b180c0704002b
X0b190c0104002b
X0b190c0204002b
X0b190c0304002b
X0b190c0404002b
X0b190c0504002b
X0b1a0c0304002b
X0b1a0c0704002b
X0b1b0c0304002b
X0b1b0c0704002b
X0b1c0c0504002b
X0b1d0c0504002b
X0b1e0c0504002b
X0b1e0c0704002b
X0b1f0c0504002b
X0b1f0c0704002b
X0b200c0304002b
X0b200c0704002b
X0b210c0704002b
X0b220c0504002b
X0b220c0704002b
X0b230c0104002b
X0b230c0304002b
X0b230c0504002b
X0b240c0504002b
X0b250c0304002b
X0b250c0704002b
X0b260c0704002b
X0b270c0004002b
X0b270c0104002b
X0b270c0404002b
X0b280c0004002b
X0b280c0104002b
X0b280c0404002b
X0b290c0104002b
X0b290c0604002b
X0b2a0c0104002b
X0b2a0c0604002b
X0b2b0c0904002b
X03200c0a07202b
X0b220c0307202b
X0b230c0607202b
X0b240c0107202b
X0b240c0607202b
X03250c0908212b
X0b220c0608212b
X0b000c010c002b
X0b010c040c002b
X0b020c040c002b
X0b030c040c002b
X0b040c040c002b
X0b050c040c002b
X0b050c060c002b
X0b060c040c002b
X0b060c060c002b
X0b070c040c002b
X0b080c040c002b
X0b090c040c002b
X0b090c050c002b
X0b090c060c002b
X0b0a0c040c002b
X0b0a0c050c002b
X0b0a0c060c002b
X0b0b0c050c002b
X0b0b0c060c002b
X0b0c0c050c002b
X0b0d0c030c002b
X0b0d0c040c002b
X0b0e0c040c002b
X0b0e0c060c002b
X0b0f0c020c002b
X0b0f0c050c002b
X0b0f0c060c002b
X0b100c050c002b
X0b110c010c002b
X0b110c030c002b
X0b120c040c002b
X0b130c040c002b
X0b140c040c002b
X0b140c050c002b
X0b150c030c002b
X0b150c040c002b
X0b160c040c002b
X0b160c050c002b
X0b170c040c002b
X0b170c050c002b
X0b180c040c002b
X0b180c050c002b
X0b1a0c040c002b
X0b1b0c040c002b
X0b1c0c030c002b
X0b1c0c040c002b
X0b1d0c030c002b
X0b1d0c040c002b
X0b1e0c030c002b
X0b1e0c040c002b
X0b1e0c060c002b
X0b1f0c020c002b
X0b1f0c030c002b
X0b200c020c002b
X0b200c050c002b
X0b210c030c002b
X0b210c040c002b
X0b220c040c002b
X0b230c020c002b
X0b240c020c002b
X0b250c040c002b
X0b250c050c002b
X0b260c030c002b
X0b260c040c002b
X0b260c060c002b
X0b270c060c002b
X0b280c060c002b
X0b290c040c002b
X0b2a0c040c002b
X0b2b0c0b0c002b
X0b2b0c0c0c002b
X03270c0c0d1c2b
X0b1c0c070d1c2b
X03210c0b0e1e2b
X0b1f0c060e1e2b
X0b200c010e1e2b
X0b200c060e1e2b
X0b210c050e1e2b
X0b220c010e1e2b
X0b240c030e1e2b
X03280c0c10282b
X0b2b0c0a10282b
X03100d0b051011
X0b100d07051011
X030f0d0c050e0f
X0b0e0d01050e0f
X0b0f0d01050e0f
V02140c00
X030d0d09060d0e
X0b0d0d05060d0e
X03130d09131314
X0b130d01131314
X0b140d05131314
V020c0c00
X030d0d0b050c0d
X0b0c0d02050c0d
X030c0d0a060b0c
X0b0c0d03060b0c
X0b0c0d05060b0c
X030c0d0b180c16
X0b0c0d01180c16
X0b0d0d01180c16
X0b130d05180c16
X0b140d01180c16
X03140d0c080a14
X0b0a0d07080a14
V02180c00
X03090d0910090a
X0b090d0310090a
X0b0a0d0310090a
V02190c00
X03100d0c0e0810
X0b090d070e0810
X03180d0a181719
X0b170d00181719
X0b180d02181719
X0b190d01181719
X03070d09100708
X0b070d03100708
X0b080d03100708
X03190d0a08191a
X0b1a0d0108191a
X03190d0909181a
X0b1a0d0609181a
X031a0d080e111a
X0b130d060e111a
X0b140d060e111a
X03080d0a020608
X0b070d00020608
X0b070d06020608
X0b080d02020608
X0b080d06020608
X030f0d0912060f
X0b070d0112060f
X09080d0012060f
X0b080d0112060f
X0b090d0112060f
X0b0a0d0112060f
X0b0f0d0512060f
V021c0c00
X031c0d0a081b1c
X0b1b0d00081b1c
X0b1c0d02081b1c
V02040c00
X03170d0c000e1d
X0b0e0d07000e1d
X03040d0a120305
X0b030d00120305
X0b040d02120305
X031e0d0b011e1e
X0b1e0d01011e1e
```

X031e0d0b081d1e
X0b1e0d06081d1e
V02200c00
X03200d0a081f20
X0b1f0d00081f20
X0b200d04081f20
X03150d0c070015
X0b060d07070015
X03140d0a0f0019
X0b090d060f0019
X0b0a0d060f0019
X0b130d000f0019
X0b140d020f0019
X0b190d060f0019
X0b190d070f0019
X03110d0c110011
X0b050d07110011
X03200d08022022
X0b220d01022022
X03230d08182223
X0b230d01182223
V02240c00
X03240d0a102324
X0b230d00102324
X0b240d04102324
X03250d08092425
X0b250d01092425
X03240d0c151c25
X0b1e0d07151c25
X03260d0c092627
X0b260d07092627
X032b0d0401222b
X0b220d0601222b
X0b0c0d0603002b
X0b0d0d0603002b
X0b000d0204002b
X0b000d0304002b
X0b010d0104002b
X0b010d0504002b
X0b010d0704002b
X0b020d0104002b
X0b020d0504002b
X0b020d0704002b
X0b030d0104002b
X0b030d0204002b
X0b030d0504002b
X0b030d0704002b
X0b040d0104002b
X0b040d0504002b
X0b040d0704002b
X0b050d0104002b
X0b050d0504002b
X0b060d0104002b
X0b060d0504002b
X0b070d0204002b
X0b070d0704002b
X0b080d0704002b
X0b0b0d0004002b
X0b0b0d0104002b
X0b0b0d0504002b
X0b0c0d0404002b
X0b0c0d0704002b
X0b0d0d0304002b
X0b0f0d0004002b
X0b0f0d0204002b
X0b0f0d0304002b
X0b0f0d0404002b
X0b0f0d0704002b
X0b100d0004002b
X0b100d0104002b
X0b100d0204002b
X0b100d0504002b
X0b110d0104002b
X0b110d0404002b
X0b110d0504002b
X0b110d0704002b
X0b120d0104002b
X0b120d0504002b
X0b130d0204002b
X0b130d0704002b
X0b140d0704002b
X0b150d0104002b
X0b150d0504002b
X0b150d0704002b
X0b160d0104002b
X0b160d0504002b
X0b170d0104002b
X0b170d0204002b
X0b170d0504002b
X0b170d0704002b
X0b180d0104002b
X0b180d0504002b
X0b180d0704002b
X0b190d0204002b
X0b190d0504002b
X0b1a0d0304002b
X0b1a0d0504002b
X0b1b0d0104002b
X0b1b0d0204002b
X0b1b0d0504002b
X0b1b0d0704002b
X0b1c0d0104002b
X0b1c0d0504002b
X0b1c0d0704002b
X0b1d0d0104002b
X0b1d0d0504002b
X0b1e0d0504002b
X0b1f0d0104002b
X0b1f0d0204002b
X0b1f0d0504002b
X0b1f0d0704002b
X0b200d0104002b
X0b200d0504002b
X0b200d0704002b
X0b210d0104002b
X0b210d0504002b
X0b220d0304002b
X0b220d0504002b
X0b230d0204002b
X0b230d0304002b
X0b230d0604002b
X0b230d0704002b
X0b240d0104002b
X0b240d0504002b
X0b240d0704002b
X0b250d0304002b
X0b250d0604002b
X0b260d0104002b
X0b260d0504002b
X0b270d0004002b
X0b270d0104002b
X0b270d0504002b
X0b280d0004002b
X0b280d0104002b
X0b280d0504002b
X0b290d0104002b
X0b290d0504002b
X0b290d0704002b
X0b2a0d0104002b
X0b2a0d0504002b
X0b2a0d0704002b
X0b2b0d0904002b
X0b2b0d0a04002b
X0b000d000c002b
X0b000d010c002b
X0b010d040c002b
X0b010d060c002b
X0b020d040c002b
X0b020d060c002b
X0b030d040c002b
X0b030d060c002b
X0b040d040c002b
X0b040d060c002b
X0b050d040c002b
X0b050d060c002b
X0b060d040c002b
X0b060d060c002b
X0b070d040c002b
X0b070d050c002b
X0b080d040c002b
X0b080d050c002b
X0b090d040c002b
X0b090d050c002b
X0b0a0d040c002b
X0b0a0d050c002b
X0b0b0d060c002b
X0b0d0d040c002b
X0b0d0d070c002b
X0b0e0d030c002b
X0b0e0d040c002b
X0b0e0d050c002b
X0b100d040c002b
X0b100d060c002b
X0b110d060c002b
X0b120d040c002b
X0b120d060c002b
X0b120d070c002b
X0b130d030c002b
X0b130d040c002b
X0b140d030c002b
X0b140d040c002b
X0b150d040c002b
X0b150d060c002b
X0b160d040c002b
X0b160d060c002b
X0b160d070c002b
X0b170d040c002b
X0b170d060c002b
X0b180d040c002b
X0b180d060c002b
X0b190d030c002b
X0b190d040c002b
X0b1a0d040c002b
X0b1a0d070c002b
X0b1b0d040c002b
X0b1b0d060c002b
X0b1c0d040c002b
X0b1c0d060c002b
X0b1d0d040c002b
X0b1d0d060c002b
X0b1d0d070c002b
X0b1e0d030c002b
X0b1e0d040c002b
X0b1f0d040c002b
X0b1f0d060c002b
X0b200d020c002b
X0b200d060c002b
X0b210d040c002b
X0b210d060c002b
X0b210d070c002b
X0b220d040c002b
X0b220d070c002b
X0b230d040c002b
X0b230d050c002b
X0b240d020c002b
X0b240d060c002b
X0b250d040c002b
X0b250d050c002b
X0b250d070c002b
X0b260d040c002b
X0b260d060c002b
X0b270d060c002b
X0b280d060c002b
X0b290d040c002b
X0b290d060c002b
X0b2a0d040c002b
X0b2a0d060c002b
X0b2b0d0b0c002b
X0b2b0d0c0c002b
X031a0d090f1a2b
X03240d080f1a2b
X03110d0a17002b
X03260d0817002b
X0b0e0d0617002b
X0b0f0d0617002b
V020f0d01
V020e0d01
X030e0e09010e10
X0b0e0e05010e10
X0b0f0e05010e10
X03130e0c011113
X0b130e01011113
V020d0d01
V02140d01
X03140e09001214
X0b140e05001214
V020c0d01
X030c0e09000c0e
X0b0c0e05000c0e
X0b0d0e05000c0e
V020a0d01
X030a0e090d090b
X0b090e010d090b
X0b0a0e030d090b
V02080d01
V02190d01
V021a0d01
X03080e090b0709
X0b070e010b0709
X0b080e030b0709
V021e0d01
V02220d01
X03220e08002123
X0b220e05002123
X03220e0c0b2224
X0b220e070b2224
X03220e09071c25
X0b230e07071c25
X0b250e07071c25
X0b000e0204002b
X0b010e0104002b
X0b020e0104002b
X0b030e0104002b
X0b040e0104002b
X0b050e0104002b
X0b060e0104002b
X0b070e0304002b
X0b070e0704002b
X0b080e0704002b
X0b090e0304002b
X0b090e0704002b
X0b0a0e0704002b
X0b0b0e0104002b
X0b0c0e0304002b
X0b0c0e0704002b
X0b0d0e0304002b
X0b0d0e0704002b
X0b0e0e0304002b
X0b0e0e0704002b
X0b0f0e0304002b
X0b0f0e0704002b
X0b100e0104002b
X0b110e0104002b
X0b120e0104002b
X0b130e0504002b
X0b130e0704002b
X0b140e0704002b
X0b150e0104002b
X0b160e0104002b
X0b170e0104002b
X0b180e0104002b
X0b190e0304002b
X0b190e0704002b
X0b1a0e0304002b
X0b1a0e0704002b
X0b1b0e0104002b
X0b1c0e0104002b
X0b1d0e0104002b
X0b1e0e0304002b
X0b1e0e0704002b
X0b1f0e0104002b
X0b200e0104002b
X0b210e0104002b
X0b220e0304002b
X0b230e0104002b
X0b230e0304002b
X0b240e0104002b
X0b250e0104002b
X0b250e0304002b
X0b260e0104002b
X0b270e0104002b
X0b280e0104002b
X0b290e0104002b
X0b2a0e0104002b
X0b2b0e0a04002b
X0b000e000c002b
X0b070e050c002b
X0b080e050c002b
X0b090e050c002b
X0b0e0e050c002b
X0b130e030c002b
X0b140e030c002b
X0b190e050c002b
X0b1a0e050c002b
X0b1e0e050c002b
X0b230e050c002b
X0b250e050c002b
X0b2b0e0c0c002b

APPENDIX A - PART II

```
 HEADER
 FILEID DEFDES /designs/em2kact/em2kact.def fb2c06f5
 CHECKSUM fb2c06f5
 PROGRAM Action Logic System
 VERSION 1.22
 VAR DEFSYS /actel/system.def
 VAR DEFUSR /actuser/ron/ron.def
 VAR DEFDES /designs/em2kact/em2kact.def
 ENDHEADER
ata PACKAGE pkg1020
ata DIE die1020
ata PLACECLOCKBALANCESTRENGTH 6
ata ta-temp-derate ind
ata timer-layout post
ata timer-condition ind
ata ta-volt-derate V450
```

```
; HEADER
; FILEID PIN /designs/EM2KACT/3M2KACT.pin e3ee24d0
; CHECKSUM e3ee24d0
; PROGRAM Action Logic System
; VERSION 1.22
; DEPEND DDFDIE /actel/die1020.ddf 9fe38a0b
; DEPEND DDFPACKAGE /actel/pkg 1020.ddf bb692866
; VAR DDFDIE /actel/die1020.ddf
; VAR DDFPACKAGE /actel/pkg1020.ddf
; ENDHEADER
DEF em2kact.
NET NONRST; ; PIN:84.
NET NBCLKIN; ; PIN:64.
                                  PINOUTS CORRESPOND TO
                                    FIGURES INDICATED
NET TX; ; PIN:2.                  RS 232 XMIT LINE
NET P_DVALID; ; PIN:42.
NET P_COMERR; ; PIN:41.
NET NBCLKOUT; ; PIN:59.
NET XIN; ; PIN:53.
NET XOUT; ; PIN:55.
NET P_PMO; ; PIN:70.              SAME A PS[], NS[], PM[], NME[] IN DIAGRAMS
NET P_NMO; ; PIN:71.              9i, 9j, 9k CONNECT TO CDb, CDe, RDb, AND RDe
NET P_PM1; ; PIN:62.              RESPECTIVELY ON FIG. 9b
NET P_NM1; ; PIN:63.
NET P_PM2; ; PIN:67.
NET P_NM2; ; PIN:68.
NET P_PM3; ; PIN:76.
NET P_NM3; ; PIN:77.
NET P_PM4; ; PIN:78.
NET RCV; ; PIN:3.                 CONNECT TO FIG. 9i, SIGNAL i-a
NET P_NM4; ; PIN:79.              SAME A PS[], NS[], PM[], NME[] IN DIAGRAMS
NET P_PM5; ; PIN:80.              9i, 9j, 9k CONNECT TO CDb, CDe, RDb, AND RDe
NET P_NM5; ; PIN:81.              RESPECTIVELY ON FIG. 9b
NET P_PWO; ; PIN:44.
NET P_CSO; ; PIN:27.              CONTACT STATUS INPUTS
                                  CONNECT TO "NEW #" OF FIG. 9a.
NET P_NSO; ; PIN:45.              SAME A PS[], NS[], PM[], NME[] IN DIAGRAMS
NET P_PS1; ; PIN:48.              9i, 9j, 9k CONNECT TO CDb, CDe, RDb, AND RDe
NET P_NS1; ; PIN:49.              RESPECTIVELY ON FIG. 9b
NET P_CS1; ; PIN:28.              CONTACT STATUS INPUTS
                                  CONNECT TO "NEW #" OF FIG. 9a.
NET P_PS2; ; PIN:50.              SAME A PS[], NS[], PM[], NME[] IN DIAGRAMS
NET P_NS2; ; PIN:51.              9i, 9j, 9k CONNECT TO CDb, CDe, RDb, AND RDe
NET P_PS3; ; PIN:10.              RESPECTIVELY ON FIG. 9b
NET P_CS2; ; PIN:29.              CONTACT STATUS INPUTS
                                  CONNECT TO "NEW #" OF FIG. 9a.
NET P_NS3; ; PIN:9.               SAME A PS[], NS[], PM[], NME[] IN DIAGRAMS
NET P_PS4; ; PIN:8.               9i, 9j, 9k CONNECT TO CDb, CDe, RDb, AND RDe
NET P_NS4; ; PIN:7.               RESPECTIVELY ON FIG. 9b
NET P-CS3; ; PIN:30.              CONTACT STATUS INPUTS
                                  CONNECT TO "NEW #" OF FIG. 9a.
NET P_PS5; ; PIN:6.               SAME A PS[], NS[], PM[], NME[] IN DIAGRAMS
NET P_NS5; ; PIN:5.               9i, 9j, 9k CONNECT TO CDb, CDe, RDb, AND RDe
                                  RESPECTIVELY ON FIG. 9b
NET P_CS4; ; PIN:31.              CONTACT STATUS INPUTS
                                  CONNECT TO "NEW #" OF FIG. 9a.
NET P_PS6; ; PIN:64.              SAME A PS[], NS[], PM[], NME[] IN DIAGRAMS
NET P_NS6; ; PIN:63.              9i, 9j, 9k CONNECT TO CDb, CDe, RDb, AND RDe
                                  RESPECTIVELY ON FIG. 9b
NET P_MSTO; ; PIN:16.             MOTOR READ STATUS INPUTS
NET P_MST1; ; PIN:17.             CONNECT TO MSTAT ON FIG. 9b
NET P_MST2; ; PIN:20.
NET P_CS5; ; PIN:32.              CONTACT STATUS INPUTS
                                  CONNECT TO "NEW #" OF FIG. 9a.
NET P_MST3; ; PIN:21.             MOTOR READ STATUS INPUTS
NET P_MST4; ; PIN:22.             CONNECT TO MSTAT ON FIG. 9b
NET P_MST5; ; PIN:23.
NET P_TDRV; ; PIN:35.             OPTO TRIAC DRIVER LINE (FIG. 9i, i-b)
                                  CONNECT TO "NEW #" ON FIG. 9a
```

~~(NEW)~~ APPENDIX B

| GATE ARRAY PIN NAME → to → | PIN-INTERFACE CIRCUITRY → to → | EXTERNAL SIGNAL NAME |
|---|---|---|
| IO13 | $LPNF_4$-4y-4A-I055 | ---- |
| IO14 | | MSTATO |
| IO15 | | MSTAT1 |
| IO16 | | MSTAT2 |
| IO17 | | MSTAT3 |
| CGN01 | | 5V_NEG |
| CGND2 | | 5V_NEG |
| I020 | | MSTAT4 |
| I021 | | MSTAT5 |
| IO22 | | CSO |
| I023 | | CS1 |
| I024 | | CS2 |
| VCC1 | | GND |
| VCC2 | | GND |
| I027 | | CS3 |
| I028 | | CS4 |
| IO29 | $LPNF_5$-5y-5A-I047 | -- |
| I030 | | CS5 |
| I031 | $LPNF_6$-6y-6A-IO43 | |
| I011 | $LPNF_3$-3y-3A-I056 | |
| I010 | $LPNF_2$-2y-2A-I069 | |
| I09 | $LPNF_1$-1y-1A-I01 | |
| I08 | | PS4 |
| I07 | | NS4 |
| I06 | | PS5 |
| I05 | | NS5 |

| GATE ARRAY PIN NAME → to → | PIN-INTERFACE CIRCUITRY → to → | EXTERNAL SIGNAL NAME |
|---|---|---|
| VCC6 | | GND |
| I03 | | GDAT-OUT |
| I02 | | GDAT-IN |
| I01 | 1A-1y-LPNF-I09 | |
| I084 | | PS5 |
| I083 | | NS6 |
| CGND6 | | 5V_NEG |
| I081 | | NM5 |
| I080 | | PM5 |
| I079 | | NM4 |
| I078 | | PM4 |
| I077 | | GA-INT |
| I076 | | GA-RST |
| I071 | | NMO |
| I070 | | PMO |
| I069 | 2A-2y-LPNF-I010 | |
| VCC5 | | GND1 |
| VCC4 | | GND1 |
| MODS | CGND5, CGND4 | 5V-NEG |
| I065 | Series R2 - CLK, Series R1 | |
| CLK | Series R1 | GA-CLK |
| I063 | | NM1 |
| I062 | | PM1 |
| CGND5 | CGND5, MODS | |
| CGND4 | CGNDS, MODS | 5V-NEG |
| I058 | | NM2 |
| I057 | | PM2 |
| I056 | 3A, 3y, $LPNF_3$, I011 | |
| I055 | 455 KHz OSC.(+) | |

| GATE ARRAY PIN NAME → to → | PIN-INTERFACE CIRCUITRY → to → | EXTERNAL SIGNAL NAME |
|---|---|---|
| I054 | -5V Power-up Reset | |
| I053 | 455KHz 0SC.(-) | |
| I052 | 4A, 4y, $LPNF_4$, I013 | |
| I051 | | NS2 |
| I050 | | PS2 |
| I049 | | NS1 |
| I048 | | PS1 |
| I047 | 5A, 5y, $LPNF_5$, I029 | |
| VCC3 | | GND1 |
| I045 | | NS0 |
| I044 | | PS0 |
| I043 | 6A, 6y, $LPNF_6$, I031 | |
| I041 | | PS7 |
| CGND3 | | 5V-NEG |
| I039 | | NS3 |
| I038 | | PS3 |
| I037 | | PM3 |
| I036 | | NM3 |
| I035 | | NDRVTRIAC |
| I034 | -Q1, -Q2 | |
| VPP | | GND1 |
| | 1y | DCLK0 |
| | 2y | DCLK1 |
| | 3y | DCLK2 |
| | 4y | DCLK3 |
| | 5y | DCLK4 |
| | 6y | DCLK5 |

Where 1A through 6A and 1y through 6y are respective inputs and outputs, and -Q1 and -Q2 are control inputs to a tri-state (74LS365) buffer; and where "$LPNF_N$" refers to one of six low-pass noise filters, e.g., implemented using a conventional series-resistance shunt-capacitance arrangement.

```
;HEADER
;FILEID PIN /designs/em2k/em2k.pin 4f15aa88
;CHECKSUM 4f15aa88
;PROGRAM Action Logic System
;VERSION 1.22
;DEPEND DDFDIE/actel/die11020.ddf 9fe38a0b
;DEPEND DDFPACKAGE /actel/pkg1020.ddf bb892886
;VAR DDFDIE /actel/die1020.ddf
;VAR DDFPACKAGE /actel/pkg1020.ddf
;ENDHEADER
DEF em2k.
NET P_NCOMERR; ; PIN:42.
NET P_READY; ; PIN:77.
NET P_DOUT; ; PIN:3.
NET P_CSO; ; PIN:22.
NET P_CS1; ; PIN:23.
NET P_DATIN; ; PIN:2.
NET P_CS2; ; PIN:24.
NET P_TRI367; ; PIN:34.
NET P_CS3; ; PIN:27.
NET P_CLKDATO; ; PIN:1.
NET P_CLKDAT1; ; PIN:52.
NET P_CS4; ; PIN:28.
NET P_CLKDAT2; ; PIN:69.
NET P_CLKDAT3; ; PIN:47.
NET P_CS5; ; PIN:30.
NET P_CLKDAT4; ; PIN 56.
NET P_CLKDAT5; ; PIN:43.
NET P_PMO; PIN:70.
NET P_NMO; ; PIN:71.
NET P_PM1; ; PIN:62.
NET P_NM1; ; PIN:63.
NET P_PM2; ; PIN:57.
NET P_NM2; ; PIN:58.
NET P_PM3; ; PIN:37.
NET P_NM3; ; PIN:36.
NET P_IOCLK; ; PIN:64.
NET P_PM4; ; PIN:78.
NET P_NM4; ; PIN:79.
NET P_PM5; ; PIN:80.
NET P-NM5; ; PIN:81.
NET P_IOCLKOUT; ; PIN:65
NET P_CLKTST; ; PIN:59.
NET P_PSO; ; PIN:44.
NET P_NSO; ; PIN:45.
NET P_PS1; ; PIN:48.
NET P_NS1; ; PIN:49.
NET P_PS2; ; PIN:50.
NET XIN; ; PIN:53.
NET P_NS2; ; PIN:51.
NET XOUT; ; PIN:55.
NET P_PS3; ; PIN:38.
NET P_NS3; ; PIN:39.
NET P_MSTO; ; PIN:14.
```

```
NET P_IDSTATO; ; PIN:9.
NET P_MST1; ; PIN:15.
NET P_PS4; ; PIN:8.
NET P_IDSTAT1; ; PIN:13.
NET P_MST2; ; PIN:16.
NET P_NS4; ; PIN:7.
NET P_IDSTAT2; ; PIN:10.
NET P_MST3; ; PIN:17.
NET P_PS5; ; PIN:6.
NET P_IDSTAT3; ; PIN:29.
NET P_MST4; ; PIN:20.
NET P_MST5; ; PIN 21.
NET P_NS5; ; PIN:5.
NET P_IDSTAT4; ; PIN:11.
NET P_PS6; ; PIN:84.
NET P_IDSTAT5; ; PIN:31.
NET P_NS6; ; PIN.83.
NET P_PS7; ; PIN:41.
NET P_TDRV; ; PIN:35.
NET P_NONRST; ; PIN:54.
NET P_UNRST; ; PIN:76.
NET P_TEST; ; PIN:32.
END.
```

What is claimed is:

1. An energy management loadpanel arrangement, comprising:

a loadpanel enclosure;

a plurality of circuit breakers secured in the enclosure and each of said circuit breakers enclosed in respective circuit breaker housings, at least one of said circuit breakers being digitally-coded and including contacts constructed and arranged for opening and closing in response to a control signal so as to interrupt and establish, respectively, an associated current path, and said at least one of the circuit breakers including a signal circuit providing a digital signal indicative of a specified type of circuit breaker; and a microcomputer circuit, located outside said respective circuit breaker housings and responsive to said digital signal, for determining the type of circuit breaker represented by said digital signal and for generating said control signal to control said at least one circuit breaker and its associated current path.

2. An energy management, loadpanel arrangement, according to claim 1, wherein said signal circuit provides the digital signal using manually settable bits.

3. An energy management, loadpanel arrangement, according to claim 2, wherein said signal circuit includes soldered jumper wires to arrange the manually settable bits.

4. An energy management, loadpanel arrangement, according to claim 2, wherein said at least one circuit breaker further includes a digital interface circuit, connected to said signal circuit, for permitting said microcomputer means to read the manually settable bits selectively.

5. An energy management, loadpanel arrangement, according to claim 4, wherein said digital interface circuit includes a shift register.

6. An energy management, loadpanel arrangement, according to claim 4, wherein said digital interface circuit indicates the number of poles included in said at least one circuit breaker.

7. An energy management, loadpanel arrangement, according to claim 1, further including a real-time-clock circuit, coupled with said at least one microcomputer means, for automatically providing the time of day to said microcomputer means.

8. An energy management, loadpanel arrangement, according to claim 1, wherein said at least one circuit breaker includes a worm gear driver for interrupting the associated current path.

9. An energy management, loadpanel arrangement, according to claim 8, wherein the gear driver includes a motor having a shaft which controls a coupling member secured to the movable contact.

10. A circuit breaker device for interrupting power in a circuit path between a source and a load in response to a control signal from a computer, the circuit breaker device comprising:

a first contact and a second contact cooperatively constructed and arranged in the circuit path to provide current from the source to the load and at least one of the contacts being movable for interrupting the power provided to the load;

a contact controller, responsive to open control and closed control signals, for moving said at least one movable contact so that the circuit path is interrupted and established, respectively; and a digital code circuit for providing a digital signal representing a designated type of circuit breaker; and a signal circuit for programming said digital code circuit to designate that the circuit breaker device is a particular type;

wherein the computer determines the type of circuit breaker by reading said digital signal and controls the circuit breaker device by sending the open control and closed control signals.

11. A circuit breaker device as claimed in claim 10 wherein the digital code circuit responds to a clock signal by providing an output signal for the microcomputer.

12. A circuit breaker device as claimed in claim 10 wherein the digital code circuit includes a parallel to serial conversion circuit.

13. A circuit breaker device as claimed in claim 12 wherein the clock signal and the output signal share a common lead.

14. A circuit breaker device as claimed in claim 12 further including motor and a printed circuit board coupled electrically to the motor and to the microcomputer.

15. A circuit breaker device as claimed in claim 10 further including a trip mechanism for moving the movable contact to an open position in response to the presence of an overload condition, and wherein the trip mechanism operates independently of the motor.

16. A remotely controllable circuit breaker device for interrupting power in a circuit path between a source and a load, comprising:

a first contact and a second contact cooperatively arranged in the circuit path so as to provide current from the source to the load and at least one of the contacts being movable for interrupting the power provided to the load;

means, responsive to open control and closed control signals generated from a remote location, for moving said at least one movable contact so that the circuit path is interrupted and established, respectively;

a rotatable gear, responsive to said means for moving and coupled to said at least one movable contact so that the circuit path is interrupted in response to said control signal;

a digital code circuit for providing a computer-readable digital signal representing a designated type of circuit breaker; and manually settable means for programming said digital code circuit to designate that the circuit breaker device is of a particular type.

17. A circuit breaker device as claimed in claim 16 wherein the digital code circuit includes means for providing the computer-readable digital signal in serial form.

18. A circuit breaker device as claimed in claim 17 wherein said means for providing further includes a shift register, responsive to a clock signal, for converting an output of said manually settable means into a serial data stream.

19. A circuit breaker device as claimed in claim 17 wherein said means for providing further includes means for receiving a clock signal and for generating at least one bit of said computer-readable digital signal on a common data line.

20. A circuit breaker device as claimed in claim 16 wherein the computer-readable digital signal indicates at least one of the following: how many poles the circuit breaker device includes, the position of the first and second contacts, current rating of the circuit breaker, whether there exists a circuit breaker.

21. An energy management loadpanel arrangement, comprising:

a loadpanel enclosure;

a plurality of circuit breakers secured in the enclosure, each of said circuit breakers enclosed in one of a plurality of housings and digitally-coded and including contacts constructed and arranged for opening and closing in response to a control signal to interrupt and establish, respectively, an associated current path and including a signal circuit providing digital signals indicative of a specified type of circuit breaker; and a microcomputer circuit, located outside said housing and responsive to said digital signal, for distinguishing one type of circuit breaker from another based on said digital signals and for generating said control signal to control said at least one circuit breaker and its associated current path.

* * * * *